(12) United States Patent
Keller et al.

(10) Patent No.: US 9,611,179 B1
(45) Date of Patent: Apr. 4, 2017

(54) REFRACTORY METAL CERAMICS AND METHODS OF MAKING THEREOF

(71) Applicant: The United States of America, as represented by the Secretary of the Navy, Washington, DC (US)

(72) Inventors: Teddy M. Keller, Fairfax Station, VA (US); Andrew P. Saab, Washington, DC (US); Matthew Laskoski, Springfield, VA (US); Manoj K. Kolel-Veetil, Alexandria, VA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 15/207,544

(22) Filed: Jul. 12, 2016

Related U.S. Application Data

(62) Division of application No. 14/245,111, filed on Apr. 4, 2014, now Pat. No. 9,403,723, which is a division of application No. 13/749,794, filed on Jan. 25, 2013, now Pat. No. 8,822,023.

(60) Provisional application No. 61/693,930, filed on Aug. 28, 2012, provisional application No. 61/669,201, filed on Jul. 9, 2012, provisional application No. 61/640,744, filed on May 1, 2012, provisional application No. 61/590,852, filed on Jan. 26, 2012.

(51) Int. Cl.

| | |
|---|---|
| *C22C 14/00* | (2006.01) |
| *C22C 16/00* | (2006.01) |
| *C22C 32/00* | (2006.01) |
| *C01B 6/02* | (2006.01) |
| *C04B 35/58* | (2006.01) |
| *C04B 35/56* | (2006.01) |
| *C04B 35/524* | (2006.01) |
| *C04B 35/76* | (2006.01) |
| *C04B 35/80* | (2006.01) |

(52) U.S. Cl.
CPC ...... *C04B 35/58014* (2013.01); *C04B 35/524* (2013.01); *C04B 35/5607* (2013.01); *C04B 35/5611* (2013.01); *C04B 35/5622* (2013.01); *C04B 35/58035* (2013.01); *C04B 35/76* (2013.01); *C04B 35/80* (2013.01); *C04B 2235/3843* (2013.01); *C04B 2235/3847* (2013.01); *C04B 2235/3886* (2013.01); *C04B 2235/404* (2013.01); *C04B 2235/48* (2013.01); *C04B 2235/524* (2013.01); *C04B 2235/5248* (2013.01)

(58) Field of Classification Search
None
See application file for complete search history.

(56) References Cited

U.S. PATENT DOCUMENTS 7,273,509 B1 * 9/2007 Keller ............... B22F 9/24
75/362

FOREIGN PATENT DOCUMENTS

| JP | 2005-132654 A | 5/2005 |
|---|---|---|
| JP | 2005-154258 A | 6/2005 |

OTHER PUBLICATIONS

Office Action in JP 2014-554838 (Jan. 24, 2017).

* cited by examiner

*Primary Examiner* — George Wyszomierski
(74) *Attorney, Agent, or Firm* — US Naval Research Laboratory; Joseph T. Grunkemeyer

(57) ABSTRACT

A composition having nanoparticles of a refractory-metal carbide or refractory-metal nitride and a carbonaceous matrix. The composition is not in the form of a powder. A composition comprising a metal component and an organic component. The metal component is nanoparticles or particles of a refractory metal or a refractory-metal compound capable of decomposing into refractory metal nanoparticles. The organic component is an organic compound having a char yield of at least 60% by weight or a thermoset made from the organic compound. A method of combining particles of a refractory metal or a refractory-metal compound capable of reacting or decomposing into refractory-metal nanoparticles with an organic compound having a char yield of at least 60% by weight to form a precursor mixture.

25 Claims, 13 Drawing Sheets

REFRACTORY METAL CERAMICS AND METHODS OF MAKING THEREOF

This application is a divisional application of U.S. Pat. No. 9,403,723, issued on Aug. 2, 2016, which is a divisional application of pending U.S. Pat. No. 8,822,023 issued on Sep. 2, 2014, which claims the benefit of U.S. Provisional Application No. 61/590,852, filed on Jan. 26, 2012, U.S. Provisional Application No. 61/640,744, filed on May 1, 2012, U.S. Provisional Application No. 61/669,201, filed on Jul. 9, 2012, and U.S. Provisional Application No. 61/693,930, filed on Aug. 28, 2012. The provisional applications and all other publications and patent documents referred to throughout this nonprovisional application are incorporated herein by reference.

TECHNICAL FIELD

The present disclosure is generally related to synthesis of refractory metal ceramics, such as titanium carbide and titanium nitride.

DESCRIPTION OF RELATED ART

Refractory transition metal carbides (MC) and nitrides have the highest known melting points (2600-3900° C.) and also outstanding hardness, chemical inertness, wear resistance, electrocatalytic activity, and neutron absorption ability. Films, fibers, and powders of these ceramics have been made from polymeric precursors, but large monolithic shapes elude the polymeric method. Refractory MCs are typically prepared by powder metallurgy methods such as hot press sintering. Ordinarily, metal carbide ceramics made by these techniques, which are both energy and time intensive, result in brittle materials, owing partly to the large granular structure and the inconsistency in the MC particle sizes. Powdered metal nitrides can be produced from metal particles in a flow of nitrogen but have to be formulated into shaped components under pressure and high temperatures.

Since the late 1960s, there has been an interest in high temperature ceramic materials for such applications as grinding/machining, ball bearings, armors, fibers, and turbine blades but structural applications have been lacking due to their brittleness and weakness in shear and tension. More recently, there has been a resurgence of interest in ultra-high temperature materials for hypersonic vehicles (Mach 5-20) with new propulsion and structural concepts. These vehicles include ballistic missiles, hypersonic cruise missiles, re-entry vehicles, space access vehicles, interceptor missiles, and hypersonic cruise aircraft, which can be easily divided into single-use expendable and reusable systems. These expendable and reusable space vehicles, next generation rocket engines, and hypersonic spacecraft need tough materials and structural components capable of operating at temperatures in excess of 2200° C. and must meet several requirements simultaneously, such as high melting temperature, high strength, and environmental resistance (oxidative resistance). A hypersonic commercial aircraft would be able to travel from New York to Los Angeles in less than an hour. Thus, current increasing interest in hypersonic vehicles and weapons points to the need for new ultra-high temperature materials for wing leading edges and nose tips along with propulsion system components.

For these applications, progress will come when materials are developed that can be easily processed into shaped components with the required thermomechanical and thermochemical characteristics and properties and that can perform without some form of cooling at temperatures exceeding 2200° C. Such materials do not currently exist. The refractory interstitial transition metal carbides are extremely hard, inert, and refractory materials. Unfortunately, they are also brittle and difficult to machine.

There is current interest in metal carbides with small particle size and high surface area such as tungsten carbide (WC) due to their potential application as catalysts. Selected MCs such as WC with outstanding catalytic properties similar to Pt promise to be an inexpensive alternative to the expensive noble metals such as Pt and Pd with possibly even superior properties due to their ability to withstand high temperatures and resistance to poisoning, which is common with the noble metals. The anodic chemistry of the direct methanol fuel cell (DMFC) requires the oxidation of methanol and the decomposition of water to produce protons, electrons, and $CO_2$. Strong chemisorption of CO on the noble metals makes these electrocatalysts susceptible to CO poisoning, blocking the active site for methanol oxidation. Consequently, the discovery of less expensive catalysts such as WC, which is more CO tolerant, has helped to commercialize the DMFC.

BRIEF SUMMARY

Disclosed herein is a composition comprising nanoparticles of a refractory-metal carbide or refractory-metal nitride and a carbonaceous matrix. The composition is not in the form of a powder.

Also disclosed herein is a composition comprising a metal component and an organic component. The metal component is selected from nanoparticles or particles of a refractory metal and a refractory-metal compound capable of decomposing into refractory-metal nanoparticles. The organic component is selected from an organic compound having a char yield of at least 60% by weight and a thermoset made from the organic compound.

Also disclosed herein is a method comprising combining particles of a refractory metal or a refractory-metal compound capable of reacting or decomposing into refractory-metal nanoparticles with an organic compound having a char yield of at least 60% by weight to form a precursor mixture.

Also disclosed herein is a method comprising: providing a precursor mixture of particles of a refractory metal or a refractory-metal compound capable of decomposing into refractory-metal nanoparticles and an organic compound; heating the precursor mixture in an inert atmosphere at elevated pressure and at a temperature that causes decomposition of the refractory-metal compound to form refractory-metal nanoparticles to form a metal nanoparticle composition; and heating the metal nanoparticle composition in an inert atmosphere, argon, or nitrogen at a temperature that causes formation of a ceramic comprising nanoparticles of a refractory-metal carbide or a refractory-metal nitride in a carbonaceous matrix. The organic compound has a char yield of at least 60% by weight when heated at the elevated pressure.

BRIEF DESCRIPTION OF THE DRAWINGS

A more complete appreciation will be readily obtained by reference to the following Description of the Example Embodiments and the accompanying drawings.

DETAILED DESCRIPTION OF EXAMPLE EMBODIMENTS

Figure 1:
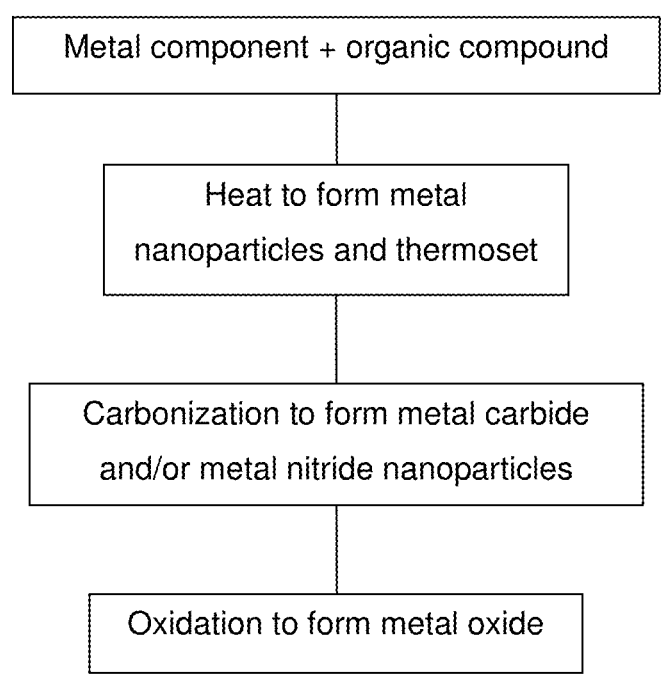
FIG. 1 schematically illustrates a process for forming the disclosed compositions.

In the following description, for purposes of explanation and not limitation, specific details are set forth in order to provide a thorough understanding of the present disclosure. However, it will be apparent to one skilled in the art that the present subject matter may be practiced in other embodiments that depart from these specific details. In other instances, detailed descriptions of well-known methods and devices are omitted so as to not obscure the present disclosure with unnecessary detail. Any numerical range disclosed herein includes every number within the range as well as those within rounding error of the end point of the range.

Disclosed herein is (1) a method for the in situ formation of refractory metal carbide (Groups IV-VI) ceramics with or without a carbon matrix in one step affording a shaped composition with structural integrity, (2) various refractory metal nanoparticle-precursor/thermoset compositions and metal-carbide and metal carbide-carbon matrix compositions at multiple stages, (3) the nanoparticle metal-carbide and nanoparticle metal carbide-carbon matrix compositions, (4) nanoparticle metal nitride-carbon matrix compositions, (5) fiber reinforced metal-carbide and metal carbide-carbon matrix composites, and (6) fiber reinforced metal nitride-carbon matrix composites.

The methods may produce refractory metal (Ti, W, Nb, Zr, Mo, Cr, V, Ta, and Hf) carbides and nitrides in shaped solid configurations from metal nanoparticles. Mixed phases can also be produced. The ceramics are produced as nanoparticles. When a) any metal compound that decomposes into highly reactive metal nanoparticles is combined with b) carbon precursors that melt and only contain carbon and hydrogen, the combination may be thermally converted to c) a solid shape containing high yields of pure metal carbides and/or metal nitrides. The appropriate metal nanoparticles are formed in situ from the thermal decompositions of metal carbonyls and metal hydrides within the melt of the carbon precursor. The carbon sources may be melt processable aromatic-containing acetylenes or low molecular weight polymers that exhibit extremely high char yields. The carbon precursor may contain only C and H to insure that heteroatoms are not incorporated into the interstitial sites of the metal nanoparticles during the reaction to produce the metal carbide and/or metal nitride. The metal carbides or metal nitrides may form between 600-1000° C. under inert conditions from reaction of the highly reactive metal nanoparticles with either the carbon precursor (degradation above 500° C.) or nitrogen gas, respectively, but in some cases the reaction can be made to occur faster at higher temperatures. The temperatures at which the synthetic process occurs may be well below those normally associated with the formation of carbide and nitride ceramics. When an excess of the carbon precursor is used, the individual formed ceramic particles may be glued or bound together with the resulting nanostructured or amorphous elastic carbon to afford structural integrity.

In the methods disclosed herein (FIG. 1), metal compounds are combined with a carbon precursor. The carbon precursors are compounds such as polymers or resins with functional unsaturation to interact with the metal nanoparticles that form from the metal compounds. The unsaturations also permit the carbon precursor to undergo conversion from the melt to form thermosets or crosslinked polymers. A typical composition includes the carbon precursor and the metal compound or multiple metal compounds. Upon heating this composition, the carbon precursor melts at its melting point and may be thermally converted to a shaped solid thermoset 20 through reaction of the unsaturated sites. It is possible that during this step or a subsequent step the metal compound thermally decomposes into metal nanoparticles 10 or the metal powder reacts with the organic component to form nanoparticles which are embedded in the solid thermoset (FIG. 2). Alternatively, the formation of the metal nanoparticles may occur later during the next step in the process, which is extended heat treatment at higher temperatures. Thermal treatment of the thermoset above 500° C. results in carbonization of the carbon precursor 30 yielding carbon atoms that react 40 in an argon atmosphere with the interstitial sites of the metal nanoparticles 50 affording the metal carbides 60, which are embedded in the excess carbon 70 (FIGS. 3-4). When the same reaction is performed in a flow of nitrogen or when the organic compound contains nitrogen, metal nitride-carbon matrix compositions are also formed in a stoichiometric ratio. Depending on the shape and thickness of the composition, both metal nitride and metal carbide may form with the metal carbide on the interior part of composition where the nitrogen cannot be in intimate contact.

Reaction of metal salts and decomposition to metal nanoparticles may occur at lower temperatures with reaction to the ceramics occurring by 1200° C. but higher temperatures may be needed at least to 1600° C. for metal powders of micron size. Smaller size particles may react faster and be totally consumed at lower temperatures relative to the larger particle size powders. The particle size of the metal carbide/nitride can be controlled as a function of the upper temperature treatment with higher exposure temperatures affording larger particle size ceramics.

Regardless of the ratio of metal compound to carbon source, the metal carbides or nitrides may form as nanoparticles. This is a highly desirable result, as it is generally accepted that homogeneous nanoparticle composites of ceramics will have better properties than their much more common microparticle counterparts. An excess of carbon atoms can be made available for reaction with the metal content and to ensure the formation of a carbon matrix in which the refractory metal carbides are bound, or the reaction can be conducted stoichiometrically to yield only the metal carbide. The amount of metal carbide and carbon within the resulting composition can be varied based on the quantity of each individual component (metal compound and melt processable carbon compound) mixed for usage in the precursor composition. When the reaction is performed in a nitrogen atmosphere, the metal nanoparticle may preferentially react with the nitrogen relative to the carbon affording the corresponding metal nitrides in pure form.

Carbon, ceramic, and metal fibers may be incorporated into various mixtures of precursor compositions composed of metal compounds of Groups IV-VI and the acetylene-containing aromatic compounds or polymers (carbon source) and the resulting fiber-containing mixture is converted to a shaped solid at temperatures below 500° C. followed by heating to temperatures around 1000-1200° C. yielding a fiber reinforced metal carbide-carbon matrix composite. The precursor composition (metal salt and carbon precursor) described above are mixed with continuous fibers or chopped fibers and heated until conversion to the shaped thermoset forms. Further heating above 500° C. in an inert atmosphere (argon) results in the formation of the fiber reinforced refractory metal carbide-carbon matrix composites. Depending on the ceramic being formed, the tough, solid shaped composite can be used for structural applications in excess of 3000° C. The composite may be exposed to an upper temperature for which it is going to be used so that the physical properties may remain intact and not change. The precursor composition can contain a combination of different refractory metal compounds that will lead to a mixture of ceramics in the composite, which could be beneficial for specific applications.

As noted above, when the metal compound and carbon precursor composition are heated in a nitrogen atmosphere, metal nitride ceramics may form with a direct incorporation of nitrogen into the lattices of the metal atoms/nanoparticles. Thus, by changing the atmosphere for performing the reaction, one can selectively form either the metal-carbide carbon-matrix composition or the metal-nitride carbon-matrix composition or combination thereof. When the fiber experiments are carried out in a nitrogen atmosphere, fiber reinforced refractory metal nitride-carbon matrix composites will be formed especially on the outer surface. The composite may have outstanding oxidative stability and temperature capabilities in excess of 3000° C.

Figure 2:
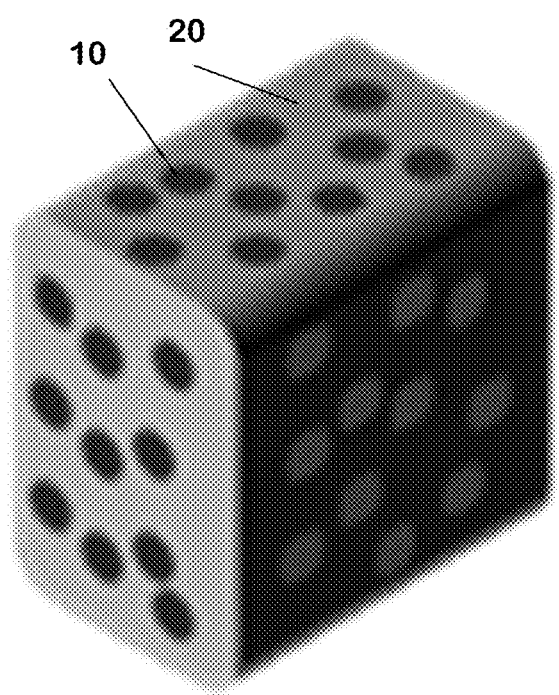
FIG. 2 schematically illustrates metal nanoparticles 10 embedded in a thermoset matrix 20.
Figure 3:
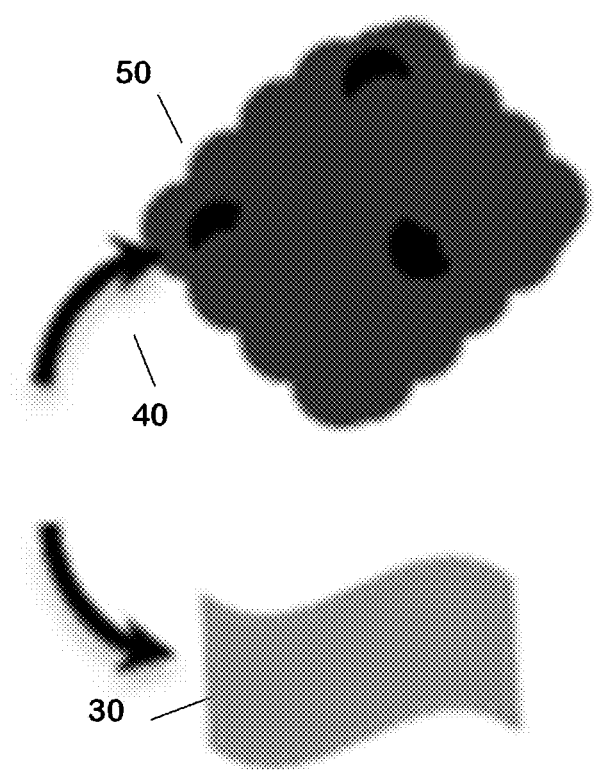
FIG. 3 schematically illustrates the transfer 40 of carbon atoms from the carbon matrix 30 to the nanoparticles 50.
Figure 4:
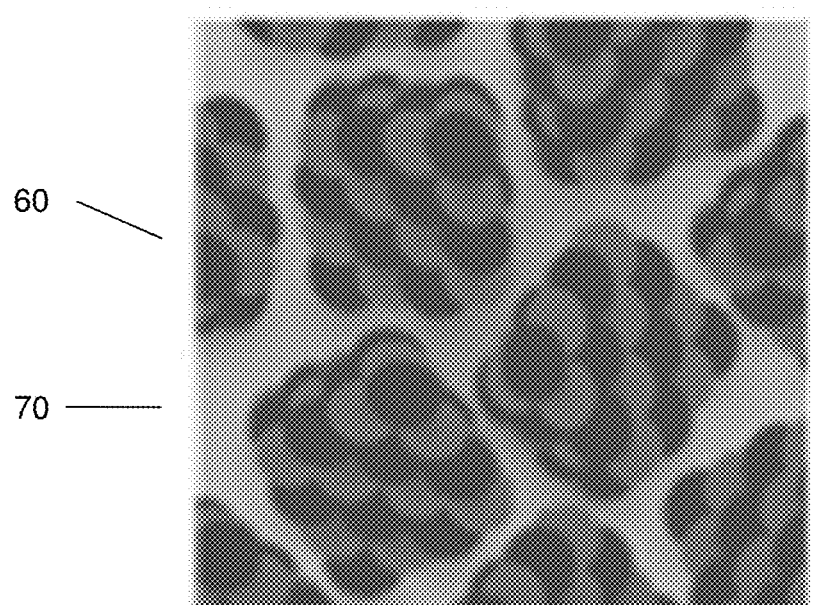
FIG. 4 schematically illustrates metal carbide nanoparticles 60 in a carbonaceous matrix 70.

The process is outlined in FIG. 1 and schematically illustrated in FIGS. 2-4. Any reactions described are not limiting of the presently claimed methods and compositions. It is speculated that the nanoparticle form of the refractory metal activates its reaction with the carbon source, thereby lowering the temperature of metal carbide or metal nitride formation. Moreover, by varying the amount of metal compound that forms reactive metal nanoparticles relative to the carbon precursor, the amount of metal carbide or metal nitride can be changed with respect to the amount of carbon matrix in order to vary the properties of the resulting composite. The metal carbide or metal nitride carbon-matrix composites are expected to show enhanced toughness, owing to the presence of the relatively elastic carbon, which would exist in forms ranging from amorphous to nanotube to graphitic carbon.

The native presence of an "elastic" carbon matrix may allow for toughening of the inherently brittle sintered ceramics. The carbon may permit operation of the toughened ceramic at extremely high temperatures, owing to carbon's high melting point (>3000° C.). Ceramic/carbon-matrix compositions are currently sought for these reasons, and the present method may permit straightforward preparation of these composites in a single step for the first time, in contrast to the traditional means of first forming the ceramic powder and then preparing the carbon-matrix composite under sintering conditions. Also, the ratio of ceramic to carbon is easily tuned based only on the ratio of metal-compound or metal powder to carbon-precursor.

Fiber-reinforced refractory metal carbide and metal nitride carbon matrix composites may exhibit outstanding mechanical properties for usage under extreme environmental high temperature conditions. Finely divided fiber reinforced refractory metal carbide carbon composites can allow the consolidation of fully dense shaped solid components with extreme fracture resistance for uses in high stress and temperature applications such as advanced engine components for hypersonic vehicles and automobiles, where increased operation temperature and mechanical integrity could translate into tremendous economic advantages. Such tough, easily shaped ceramic composites are critical to the next generation of jet engines, which are being designed to operate at higher internal temperatures and stresses than those in current service, and in advanced automobile engines and supporting components. High temperature ship deck plates could be readily fabricated for aircraft carriers needing the superior heat resistant properties of the metal carbide and/or metal nitride ceramic-carbon composites. Also, lightweight, tough, and hard ceramics easily made in controllable forms could be very important for the fabrication of superior military armor; again fabricated in a mold in a shaped structure. Tungsten carbide (WC) is currently used as warheads for munitions due to its superior hardness and high density and would be more economical to produce by the WC formulated from the precursor compositions disclosed herein. The ability to fabricate tough, shaped refractory metal carbide or metal nitride components in one step enhances their importance due to the economic advantages and the elimination of machining to a shaped component.

In the first step of the method, two components are combined and may be thoroughly mixed. One is a metal component which may be a refractory-metal compound capable of decomposing into refractory metal nanoparticles or particles of a refractory metal. Any refractory metal may be used, including but not limited to a group IV-VI transition metal, titanium, zirconium, hafnium, tungsten, niobium, molybdenum, chromium, tantalum, or vanadium. When a pure metal is used, it may be in the form of nanoparticles or other particles such as a powder. When such metal particles are used, the metal may directly react with the organic component. Suitable powders include, but are not limited to, tungsten and tantalum.

Instead of pure metal, a compound containing the metal atom may be used. Such compounds decompose at elevated temperatures, releasing the metal atoms so that they may react with the organic component. Suitable such compounds include, but are not limited to, a salt, a hydride, a carbonyl compound, or a halide of the refractory metal. Examples include titanium hydride, zirconium hydride, and hafnium hydride. Other examples and embodiments of types of compounds which may be used with the metals disclosed herein may be disclosed in U.S. Pat. Nos. 6,673,953; 6,770,583; 6,846,345; 6,884,861; 7,722,851; 7,819,938; 8,277,534.

The other component is an organic compound that has a char yield of at least 60% by weight. The char yield may also be as high as at least 70%, 80%, 90%, or 95% by weight. The char yield of a potential compound may be determined by comparing the weight of a sample before and after heating to at least 1000° C. for at least 1 hr in an inert atmosphere such as nitrogen or argon. Any such compounds with high char yields may be used as the charring may play a role in the mechanism of the reactions. This char yield may be measured at an elevated pressure to be used when a heating step is also performed at such pressure. Thus, a compound having a low char yield at atmospheric pressure but having a high char yield under the conditions that the disclosed methods are performed may be suitable.

Certain organic compounds may exhibit any of the following characteristics, including mutually consistent combinations of characteristics: containing only carbon and hydrogen; containing aromatic and acetylene groups; containing only carbon, hydrogen, and nitrogen or oxygen; containing no oxygen; and containing a heteroatom other than oxygen. It may have a melting point of at most 400° C., 350° C., 300° C., 250° C., 200° C. or 150° C. and the melting may occur before polymerization or degradation of the compound. Examples of organic compounds include, but are not limited to, 1,2,4,5-tetrakis(phenylethynyl)benzene (TPEB), N, N'-(1,4-phenylenedimethylidyne)-bis-(3-ethynylaniline) (PDEA), N,N'-(1,4-phenylenedimethylidyne)-bis(3,4-dicyanoaniline) (dianilphthalonitrile), and 1,3-bis(3, 4-dicyanophenoxy)benzene (resorcinol phthalonitrile). Prepolymers may also be used, such as a prepolymer of TPEB or other suitable organic compounds. Different compounds can be blended together and/or reacted to a prepolymer stage before usage as the organic compound of the precursor composition. The presence of nitrogen atoms in the organic compound may produce metal nitrides in the ceramic without the use of a nitrogen atmosphere.

More than one metal, metal compound, and/or organic compound may be used. Two or more different metals may be used to produce two different metal carbides and/or nitrides in the ceramic. Also, in some cases only one compound may be used when the metal component and the organic component are the same compound. Such compounds may be high in carbon and hydrogen to produce a high char yield, but also have a refractory metal bound to the compound.

An optional third component in the precursor materials is a plurality of fibers or other fillers. Examples of fibers include, but are not limited to, carbon fibers, ceramic fibers, and metal fibers. The fibers may be of any dimension that can be incorporated into the mixture and may be cut or chopped to shorter dimensions.

The precursor mixture, which may be mixed in a melt stage, then undergoes a heating step to form a metal nanoparticle composition. This may be performed while the mixture is in a mold. This will allow the final product to have the same shape as the mold, as the mixture will melt if not already liquid and fill the mold during the heating, and retain its shape when the ceramic is formed. The precursor mixture is heated in an inert atmosphere at a temperature that causes decomposition of the refractory-metal compound to form refractory-metal nanoparticles. If the organic compound is volatile, the heating may be performed under pressure to avoid evaporation of the organic compound. As used herein, this heating step includes the formation of nanoparticles from a metal powder. As the reaction proceeds from the metal powder, the metal particles will become smaller. It is not necessary to verify that the nanoparticles are formed in order to continue with the method. However, any known technique for detecting nanoparticles such as SEM or x-ray diffraction analysis (XRD) may be used if desired to verify that the metal component suitably produces nanoparticles. Suitable heating temperatures include, but are not limited to, 150-500 or 600° C.

Heating the precursor may also cause the polymerization of the organic compound to a thermoset. The metal nanoparticles 10 would then be dispersed throughout the thermoset 20 as shown in FIG. 2. The organic compound may also polymerize before the nanoparticles are formed. A thermoset having the refractory-metal compound or particles (including nanoparticles) of refractory metal dispersed throughout may be used as a final product. The thermoset may also be machined to a desired shape, followed by heating to form a ceramic as described below.

The metal source may be homogeneously distributed or embedded in the thermoset as an intermediate shaped solid. At this stage, the composition may have a shape that it will retain upon further heating and conversion to the ceramic from reaction of the metal source with the developing carbon matrix.

The precursor mixture may be consolidated to a shaped solid component under pressure to promote intimate contact of the reactants to provide a very dense ceramic solid or to densify the final product. The precursor mixture may be compacted under exterior pressure, removed from the pressure, and then heated to a thermoset followed by conversion to the ceramic. Alternatively, the precursor mixture may be compacted under exterior pressure and the pressure maintained while heating to the thermoset and ceramic.

In a second heating step, the metal nanoparticle composition is heated to form a ceramic. The heating is performed at a temperature that causes formation of nanoparticles of a refractory-metal carbide or a refractory-metal nitride 60 in a carbonaceous matrix 70 (FIG. 4). The carbonaceous matrix may comprise graphitic carbon, carbon nanotubes, and/or amorphous carbon. If an inert atmosphere such as argon is used, metal carbide nanoparticles may be formed. If nitrogen is present, metal nitride nanoparticles may be formed. There may be a higher concentration of nitrides on the surface than in the interior. Suitable heating temperatures include, but are not limited to, 500-1900° C.

Nanoparticles that may be formed include, but are not limited to, titanium carbide, titanium nitride, zirconium carbide, zirconium nitride, hafnium carbide, hafnium nitride, tungsten carbide, tungsten nitride, tantalum carbide, and tantalum nitride. The presence and composition of the metal carbide or nitride particles may be verified by any known technique for detecting nanoparticles such as SEM or XRD. The nanoparticles may have an average diameter of less than 100 nm, 50 nm, or 30 nm. They may be generally spherical in shape or may be non-spherical, such as nanorods.

The ceramic may include any amount of nanoparticles, including but not limited to, at least 5%, 10%, 20%, 30%, 40%, 50%, 60%, 70%, 80%, 90%, 95%, or 99% by weight of nanoparticles. The percentage of nanoparticles may be in part determined by the molar ratio of metal to carbon atoms in the precursor mixture. At a 1:1 ratio, nearly all of the carbon may be incorporated into the nanoparticle, leaving a small amount or trace of carbonaceous matrix. With higher amounts of organic compound, the fraction of nanoparticles is lower and the fraction of carbonaceous matrix is higher. By this method, variations in the ratio of metal to organic may be used, affording a mixture of metal carbide when performed in an inert atmosphere such as argon and metal nitride when performed in a nitrogen atmosphere. When metal nitrides are made, raising the amount of carbon in the precursor mixture may lower the amount of metal nitride in the ceramic.

The ceramic is not formed as a powder and may be in the form of a solid, unbroken mass. It may contain less than 20% by volume of voids or as low as 10%, 5%, or 1%. A WC-carbon ceramic may be made with less than 50% voids.

It may have the same shape as the precursor mixture or it may take on the shape of a mold it was placed in during the heating. The ceramic may retain its shape in that it does not crumble when handled and may not change shape or break without the use of extreme force. The ceramic composition may be tough, hard, and have structural integrity. The degree of such properties may depend on the amount of ceramic to carbon in the solid ceramic solid composition. Any shape may be formed to make an article useful for incorporation into an apparatus. The article may be large enough to have a minimum size of at least 1 cm in all dimensions. That is, the entire surface of the article is at least 5 mm from the center of mass of the article. Larger articles may be made, such as having a minimum size of at least 10 cm in all dimensions. Also, the composition may have smaller sizes, such as 1 mm, 2 mm, or 5 mm.

A third heating step may also be performed, where the ceramic is heated in an oxygen-containing atmosphere to form an oxide of the refractory metal on the surface of the ceramic. For example, titanium oxide may be formed on the surface. Such surface oxidation may protect the interior of the ceramic from further oxidation.

The following examples are given to illustrate specific applications. These specific examples are not intended to limit the scope of the disclosure in this application. Any other appropriate methods and materials disclosed in U.S. Provisional Application Nos. 61/590,852; 61/640,744; 61/669,201; 61/693,930 may be used. Any carbon source, metal compound, and/or other parameter disclosed therein may be used in any combination in the presently disclosed method, and may be combined with any material and/or parameter disclosed in the present application.

Example 1

Formulation of Precursor Composition of $TiH_2$ and TPEB—

TPEB (0.1016 g; 0.2125 mmol) and $TiH_2$ (0.2008 g; 4.0224 mmol) were thoroughly mixed and used as the precursor composition for the formation of refractory nanoparticle TiC embedded or bonded with the excess of carbon that behaves as a matrix material. The ratio of the two reactants can be readily varied by the described formulation method.

Example 2

Formation of Refractory TiC Solid Ceramic in One Step by Heating at 10° C./Min to 1400° C. Under an Argon Atmosphere—

Figure 5:
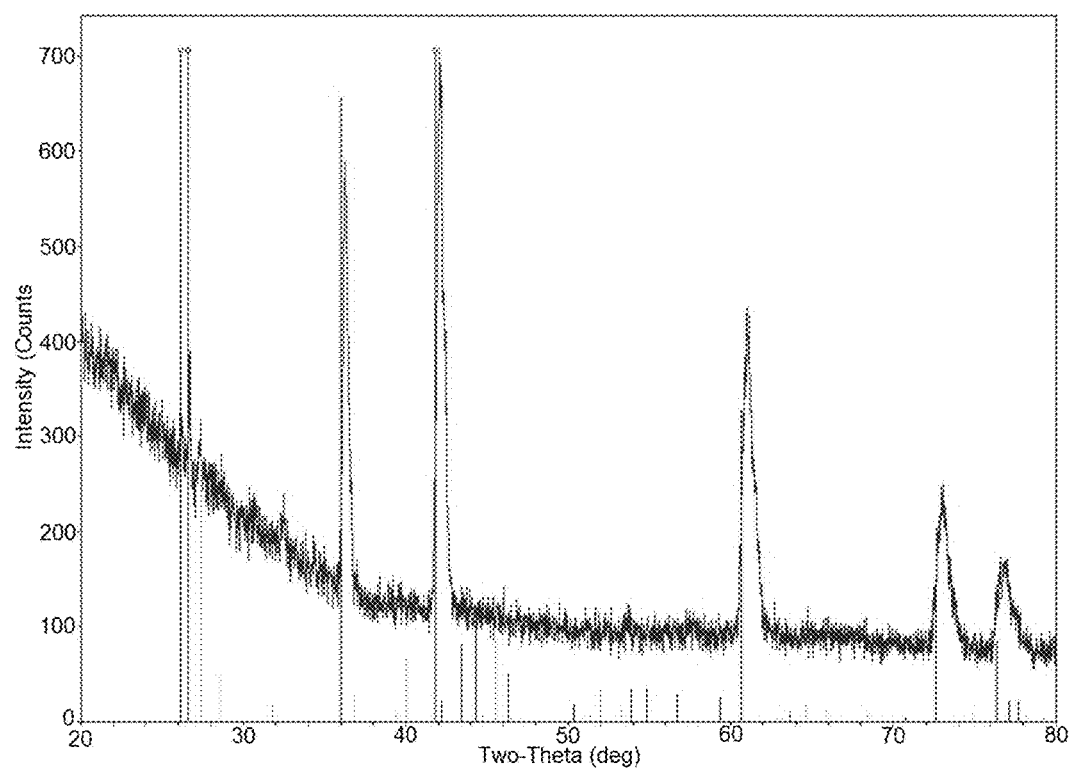
FIG. 5 shows an X-ray diffraction analysis (XRD) of a sample containing TiC nanoparticles.

A sample (5.8911 mg) of the precursor composition prepared in Example 1 was weighed into a TGA ceramic pan and directly heated at 10° C. under a flow (100 cc/min) of argon to 1400° C. yielding a solid ceramic material with a weight retention of 89.24%. During the heat treatment, the sample melted at about 194° C. (endothermic transition; TPEB) and exhibited an exothermic transition peaking at about 292° C. (cure to thermoset solid polymer). The solid ceramic was removed from the TGA pan and characterized by XRD and was found to have formed nanoparticle sized TiC in an excess of carbon as the matrix. The TiC carbon solid composition was formed in one step and exhibited structural integrity. FIG. 5 shows a typical XRD of a TiC sample made by the method of this example.

Example 3

Formation of Refractory TiC Solid Ceramic in One Step by Controlled Heating to 1200° C. Under an Argon Atmosphere—

A sample (62.1426 mg) of the precursor composition prepared in Example 1 was heated under an argon atmosphere at 5° C./min to 250° C. and held at this temperature for 2 hr to consolidate to a solid shaped thermoset polymer. During the heat treatment to 250° C., the sample showed an endothermic transition at about 195° C. attributed to the melting point of TPEB. The isothermal heat treatment at 250° C. resulted in the reaction of the ethynyl units in the TPEB and conversion to the shaped thermoset polymer. The solid polymeric sample composed of $TiH_2$ and the polymeric thermoset was slowly heated at 1° C./min to 1200° C. and held at this temperature for 6 hr affording a weight retention of 89.78%. Above 400° C., degradation of the $TiH_2$ occurred to Ti nanoparticles and $H_2$ and the $H_2$ vaporized from the sample. Further heating above 500° C. to 1200° C. resulted in the reaction of the highly reactive Ti nanoparticles with the developing carbon atoms being formed from the carbonization of TPEB during the heat treatment resulting in the formation of TiC nanoparticles embedded in excess carbon formed during the simple carbonization process. The refractory TiC ceramic carbon matrix composite was formed in one step. XRD analysis showed high yield of TiC nanoparticles and a small amount of crystalline carbon as the products formed during the heat treatment.

Example 4

Formation of Refractory TiC Solid Ceramic in One Step by Controlled Heating to 1400° C. Under an Argon Atmosphere—

A sample (67.200 mg) of the precursor composition prepared in Example 1 was heated under an argon atmosphere at 5° C./min to 250° C. and held at this temperature for 2 hr to consolidate to a solid shaped thermoset polymer. During the heat treatment to 250° C., the sample showed an endothermic transition at about 195° C. attributed to the melting point of TPEB. The isothermal heat treatment at 250° C. resulted in the reaction of the ethynyl units in the TPEB and conversion to the shaped thermoset polymer. The solid sample composed of $TiH_2$ and the thermoset polymer was slowly heated at 1° C./min to 1400° C. and held at this temperature for 4 hr affording a weight retention of 89.33%. Above 400° C., degradation of the $TiH_2$ occurred to Ti nanoparticles and $H_2$ and the $H_2$ vaporized from the sample. Further heating above 500° C. to 1400° C. resulted in the reaction of the highly reactive Ti nanoparticles with the developing carbon atoms being formed from the carbonization of TPEB during the heat treatment resulting in the formation of TiC nanoparticles embedded in excess carbon formed during the simple carbonization process. The refractory TiC ceramic carbon matrix composite was formed in one step. XRD analysis showed high yield of TiC nanoparticles and a small amount of crystalline carbon as the products formed during the heat treatment.

Example 5

Formation of Refractory TiC Solid Ceramic in One Step by Controlled Heating of 2° C./Min to 1400° C. Under an Argon Atmosphere—

A sample (64.7660 mg) of the precursor composition prepared in Example 1 was heated in a TGA chamber under an argon atmosphere at 5° C./min to 250° C. and held at this temperature for 2 hr to consolidate to a solid shaped thermoset polymer. During the heat treatment to 250° C., the sample showed an endothermic transition at about 195° C. attributed to the melting point of TPEB. The isothermal heat treatment at 250° C. resulted in the reaction of the ethynyl units in the TPEB and conversion to the shaped thermoset polymer. The solid sample composed of $TiH_2$ and the thermoset polymer was slowly heated at 2° C./min to 1400° C. and held at this temperature for 4 hr affording a weight retention of 89.77%. Above 400° C., degradation of the $TiH_2$ occurred to Ti nanoparticles and $H_2$ and the $H_2$ vaporized from the sample. Further heating above 500° C. to 1400° C. resulted in the reaction of the highly reactive Ti nanoparticles with the developing carbon atoms being formed from the carbonization of TPEB during the heat treatment resulting in the formation of TiC nanoparticles embedded in excess carbon formed during the simple carbonization process. The refractory TiC ceramic carbon matrix composite was formed in one step. XRD analysis showed high yield of TiC nanoparticles and a small amount of crystalline carbon as the products formed during the heat treatment.

Example 6

Formation of Stable $TiO_2$ on Outer Surface as Film from Exposure of TiC Solid Ceramic to Flow of Air—

The TiC carbon composite sample (56.2200 mg) prepared in Example 5 was cooled and further heated in the TGA chamber in a flow of air (100 cc/min) at 5° C./min to 1400° C. The sample started to slowly exotherm above 500° C. peaking at about 644° C. with a slight increase in weight. As the heating was continued to 1400° C., an increase in weight of 20% was observed on this small sample attributed to oxidation (white layer) on the outer surface of the sample. XRD analysis confirmed the formation of $TiO_2$ (white layer) on the outer surface. Below this surface, a black surface was intact and attributed to the original TiC-carbon composition.

Example 7

Controlled Oxidation of TiC Carbon Composite—

The sample (68.2060 mg) formed during the oxidation of Example 6 was cooled and reheated at 10° C./min to 1400° C. under a flow of air (100 cc/min). Basically, no change in the weight was observed indicating that no further oxidation was occurring after the initial oxidation to form the film ($TiO_2$) on the outer surface. The $TiO_2$ was behaving as a barrier protecting the inner portion of the sample against further oxidation.

Example 8

Melt Formulation of Solid Precursor Composition of $TiH_2$ and TPEB—

TPEB (0.600 g; 1.255 mmol) was melted at 255° C. in an aluminum planchet treated with a silicone mold release. $TiH_2$ (1.65 g; 33.1 mmol) was added to the melt and thoroughly mixed until the mixture thickened (polymerization of the acetylene units to thermoset polymer). Various precursor polymeric compositions ($TiH_2$ and TPEB) can be formulated by this method by varying the ratio of the two reactants (TPEB and $TiH_2$).

Example 9

Formation of Refractory TiC Solid Ceramic Carbon Composition in One Step by Heating at 2° C./Min to 1000° C. Under an Argon Atmosphere—

The thermoset sample (1.98 g) prepared in Example 8 was heated in a tube furnace at 2° C./min to 1000° C. yielding the solid ceramic material with a weight retention of 95%. The sample was characterized by XRD and was found to form pure nanoparticle sized TiC embedded in an excess of carbon as the matrix. The TiC nanoparticle carbon solid composition was formed in one step and retained its structural integrity.

Example 10

Formation of Refractory TiN Solid Ceramic Carbon Composition in One Step by Controlled Heating to 1400° C. Under a Nitrogen Atmosphere—

Figure 6:
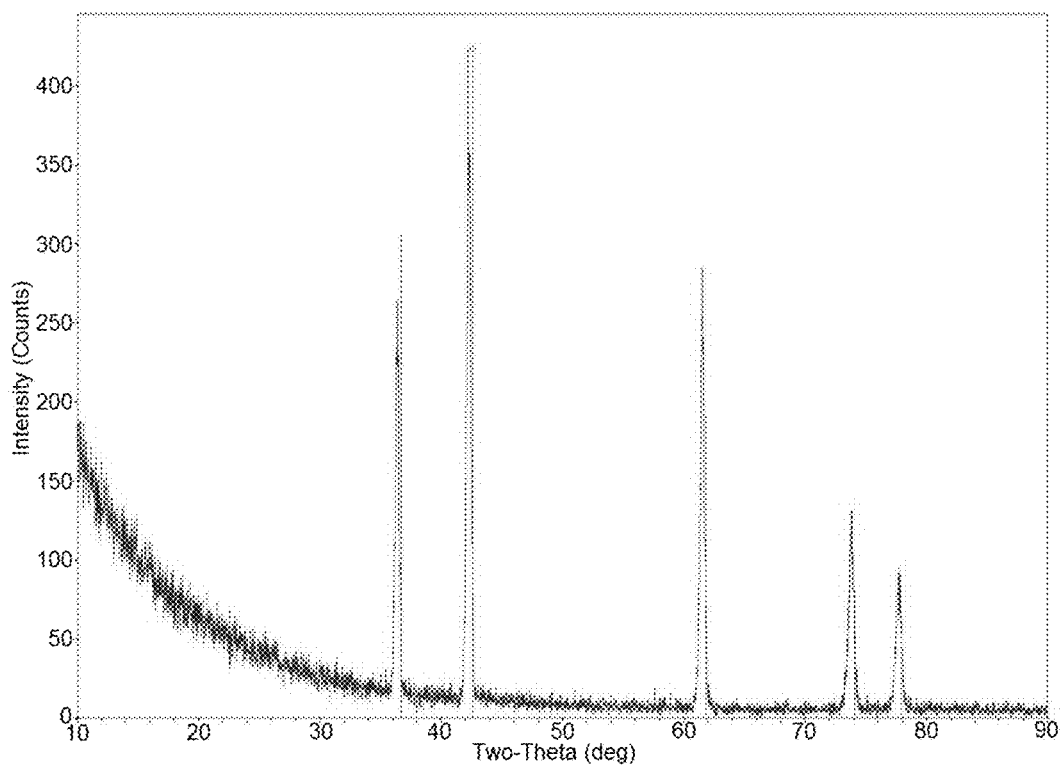
FIG. 6 shows an XRD of a sample containing TiN nanoparticles.

A sample (5.1780 mg) of a precursor composition prepared as in Example 1 was weighed into a TGA ceramic pan and heated at 10° C. under a flow (100 cc/min) of nitrogen to 1400° C. yielding a solid material with a weight retention of 89.24%. During the heat treatment, the sample melted at about 194° C. (endothermic transition; TPEB) and exhibited an exothermic transition peaking at about 292° C. attributed to the cure to solid thermoset polymer. After the heat treatment at 1400° C., the solid ceramic was removed from the TGA pan and characterized by XRD and was found to contain TiN nanoparticles embedded or bonded in an excess of carbon as the matrix. The TiN carbon solid composition was formed in one step in the nitrogen atmosphere. In contrast, when the reaction was run under an argon atmosphere, the TiC nanoparticles (embedded in excess carbon) were formed from reaction of the Ti nanoparticles with the carbon atoms during the carbonization process. FIG. 6 shows a typical XRD of a TiN sample made by the method of this example.

Example 11

Formation of Refractory TiN Solid Ceramic in One Step by Controlled Heating at 2° C./Min to 1400° C. Under a Nitrogen Atmosphere—

A sample (77.4586 mg) of the precursor composition prepared as in Example 1 was heated in a TGA chamber under a nitrogen atmosphere at 5° C./min to 250° C. and held at this temperature for 2 hr to consolidate to a solid shaped thermoset polymer. At this time, the solid polymer sample, composed of TPEB and $TiH_2$, was slowly heated at 2° C./min to 1400° C. and held at this temperature for 3 hr affording a solid ceramic carbon composition with a weight retention of 92.94 wt. During the heat treatment, the sample showed an endothermic transition at about 195° C. attributed to the melting point of TPEB. The isothermal heat treatment at 250° C. resulted in the reaction of the ethynyl units in the TPEB and conversion to a shaped solid thermoset polymer. Further heating above 400° C. resulted in the degradation of the $TiH_2$ to Ti nanoparticles and $H_2$, of which the $H_2$ vaporized from the sample as formed. Further heating above 500° C. to 1400° C. resulted in the reaction of the highly reactive Ti nanoparticles with the developing carbon atoms being formed from degradation of TPEB during the carbonization process resulting in the formation of TiN nanoparticles embedded in excess carbon formed. The refractory TiN ceramic carbon matrix composition was formed in one step. XRD analysis of the solid ceramic carbon matrix composition showed high yield of nanoparticle TiN nanoparticles and crystalline carbon as the products from the heat treatment.

Example 12

Formation of Solid Precursor Composition of $TiH_2$ and PDEA by Melt Mixing—

N,N'-(1,4-phenylenedimethylidyne)-bis-(3-ethynylaniline) (PDEA) (0.516 g; 1.394 mmol) was melted at 160° C. in an aluminum planchet treated with a silicone mold release. $TiH_2$ (1.65 g; 33.1 mmol) was added to the melt, thoroughly mixed, and heated under an argon atmosphere until the mixture thickened from polymerization of the terminal acetylene units to a thermoset polymer. The solid thermoset polymer composition was heated at 160° C. for 1 hr was cooled, removed from the mold, and used for the formation of refractory nanoparticle TiC and TiN compositions.

Example 13

Conversion of Solid Precursor Composition $TiH_2$ and PDEA to Refractory TiC/TiN Solid Ceramic in One Step by Heating at 10° C./Min to 1000° C. Under an Argon Atmosphere—

A sample (1.896 g) prepared as in Example 12 was heated under an atmosphere of argon in a tube furnace at 2° C./min to 1000° C. yielding the solid ceramic material with a weight retention of 95%. The sample was characterized by XRD and was found to contain both TiC and TiN embedded in an excess of carbon as the matrix. The TiC and TiN nanoparticle carbon solid composition was formed in one step and retained its structural integrity. When another small sample was heated in a nitrogen atmosphere, only TiN nanoparticles embedded in carbon were formed.

Example 14

Formulation of Solid Precursor Thermoset Polymeric Composition of $TiH_2$ and Dianilphthalonitrile by Melt Mixing—

Dianilphthalonitrile (0.600 g; 1.56 mmol) was melted at 300° C. in an aluminum planchet treated with a silicone mold release. $TiH_2$(1.66 g; 33.2 mmol) and 3 weight % p-BAPS (curing additive) were added, thoroughly mixed, and heated at 300° C. until the mixture thickened from polymerization of the terminal phthalonitrile units to a thermoset polymer. Once solidified by heating at 300° C. for 1 hr, the solid polymeric mass was cooled, removed from the mold, and used for the formation of refractory nanoparticle TiC and TiN nanoparticles embedded or bonded within the excess carbon that behaves as a matrix material. The ratio of the two reactants can be varied by this described method and will yield a thermoset polymer with homogeneous distribution of the $TiH_2$ within the domain of the polymer. The overall physical properties of the polymer can be easily varied with varying amounts of the reactants.

Example 15

Conversion of Solid Precursor Thermoset Polymeric Composition of $TiH_2$ and Dianilphthalonitrile to Refractory TiC and TiN Solid Carbon Ceramic in One Step by Heating at 10° C./Min to 1000° C. Under an Argon Atmosphere—

A polymeric sample (2.068 g) prepared as in Example 14 was heated under an argon atmosphere in a tube furnace at 2° C./min to 1000° C. yielding the solid ceramic material with a weight retention of 92.1%. The ceramic sample was characterized by XRD and was found to contain nanoparticle-containing TiC and TiN embedded in an excess of carbon as the matrix. The TiC and TiN carbon solid ceramic composition was formed in one step and retained its structural integrity.

Example 16

Formulation of Solid Precursor Composition of $TiH_2$ and Resorcinol Phthalonitrile by Melt Mixing—

Resorcinol phthalonitrile (0.500 g; 1.381 mmol) was melted at 300° C. in an aluminum planchet treated with a silicone mold release. $TiH_2$ (1.65 g; 33.1 mmol) and 3 weight % p-BAPS were added, thoroughly mixed, and heated at 300° C. under an argon atmosphere until the mixture thickened from polymerization of the terminal phthalonitrile units to a thermoset polymer. Once solidified by heating at 300° C. for 1 hr, the solid polymeric mass was cooled, removed from the mold, and used for the formation of refractory nanoparticle TiC and TiN carbon compositions.

Example 17

Conversion of Solid Precursor Thermoset Polymeric Composition of $TiH_2$ and Resorcinol Phthalonitrile to Refractory TiC and TiN Solid Ceramic in One Step by Heating at 10° C./Min to 1000° C. Under an Argon Atmosphere—

A polymeric sample (1.978 g) prepared as in Example 16 was heated in a tube furnace at 2° C./min to 1000° C. yielding the solid ceramic material with a weight retention of 91.5%. The ceramic sample was characterized by XRD and was found to contain nanoparticle-containing TiC and TiN embedded in carbon as the matrix. The TiC and TiN carbon solid shaped composition was formed in one step and retained its structural integrity.

Example 18

Formulation and Formation of Solid Cone-Shaped Thermoset Polymeric Composition of $TiH_2$ and TPEB by Melt Mixing—

TPEB (3.61 g; 7.552 mmol) was melted at 255° C. in an aluminum foil mold that had been pressed into a conical shape and treated with a silicone mold release. $TiH_2$ (7.18 g; 143.7 mmol) was added, thoroughly mixed, and heated under an argon atmosphere until the mixture thickened by polymerization of the acetylene units to a thermoset polymer. Once the composition had solidified (30 min), the solid shaped polymeric mass was cooled and removed from the mold. The ratio of the two reactants can be easily varied by the method described in this Example 18 for formulation to a thermoset polymer. Using the various solid thermoset polymeric composition containing varying amounts of the two reactants, the overall physical properties of the corresponding TiC-carbon matrix composition, by heating the polymeric compositions above 500° C. under a flow of argon, can be readily changed. In addition, the amounts of each reactant can be changed to afford the formation of just TiC nanoparticles or TiC nanoparticles embedded in varying amounts of carbon.

Example 19

Conversion of Solid Cone-Shaped Thermoset Polymeric Composition of $TiH_2$ and TPEB to Refractory TiC Solid Cone-Shaped Ceramic in One Step by Heating at 10° C./Min to 1000° C. Under an Argon Atmosphere—

A thermoset polymer sample (9.962 g) prepared as in Example 18 was heated in a tube furnace at 2° C./min to 1000° C. yielding the solid ceramic material with a weight retention of 91.2%. The ceramic sample was characterized by XRD and was found to contain TiC nanoparticles embedded in an excess of carbon as the matrix. The refractory TiC ceramic carbon solid composition was formed in one step and retained its structural integrity. This example shows that any shaped configuration containing refractory metal carbide in carbon as matrix can be formed from a refractory metal source that degrades or decomposes to metal nanoparticles that react with the developing carbon atoms of a carbon source (resin or polymer) during the elevated heat treatment under inert conditions.

Example 20

Formulation of Precursor Composition of $ZrH_2$ and TPEB—

TPEB (0.0.0974 g; 0.203 mmol) and $ZrH_2$ (0.500 g; 5.361 mmol) were thoroughly mixed as powders and used as the precursor for the formation of refractory ZrC or ZrN nanoparticles embedded or bonded with the slight excess carbon that behaves as a matrix material. The ratio of the two reactants can be varied to form various concentrations of powdered precursor composition.

Example 21

Formation of Refractory ZrC Solid Ceramic Composition in One Step by Heating at 10° C./Min to 1400° C. Under an Argon Atmosphere—

Figure 7:
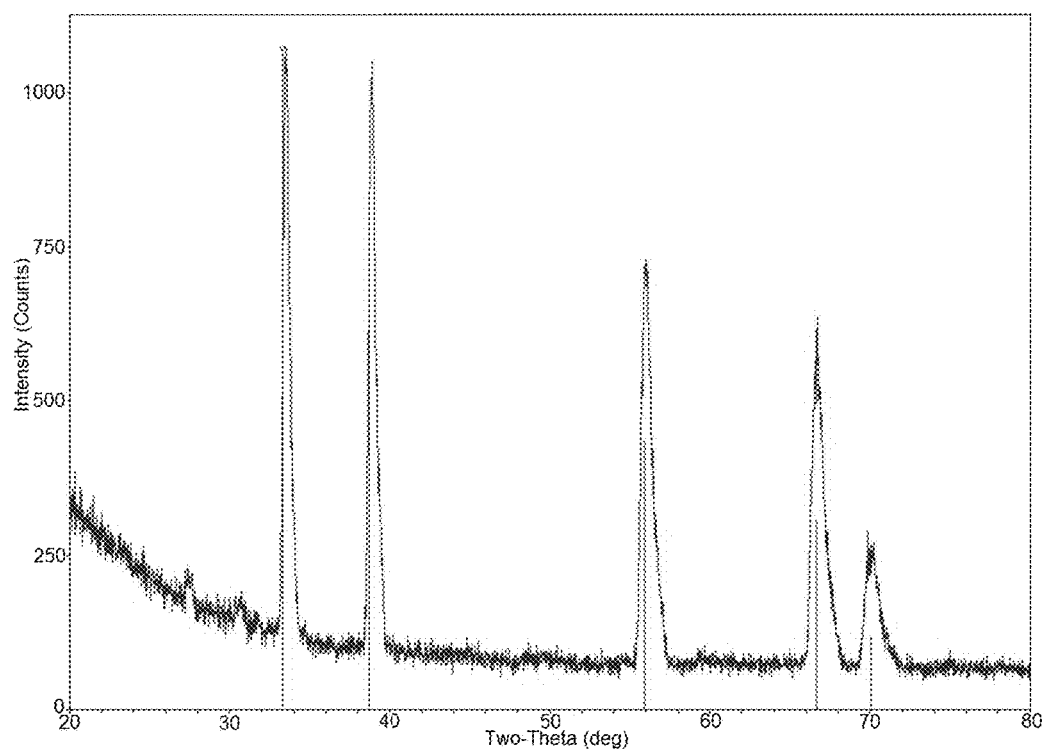
FIG. 7 shows an XRD of a sample containing ZrC nanoparticles.

A sample (20.9090 mg) of the precursor composition prepared in Example 20 was weighed into a TGA ceramic pan and heated at 10° C. under a flow (100 cc/min) of argon to 1400° C. yielding a solid material with a weight retention of 94.34%. During the heat treatment, the sample melted at about 194° C. (endothermic transition; TPEB) and exhibited an exothermic transition peaking at about 292° C. attributed to the cure to a solid thermoset polymer. After cooling from 1400° C. to room temperature, the solid ceramic composition was removed from the TGA pan, characterized by XRD and was found to contain nanoparticle sized ZrC in an excess of carbon as the matrix. The shaped solid ceramic refractory ZrC carbon composite was formed in one step and exhibited structural integrity. FIG. 7 shows a typical XRD of a ZrC sample made by the method of this example.

Example 22

Formation of Refractory ZrC Solid Ceramic in One Step by Controlled Heating of 2° C./Min to 1400° C. Under an Argon Atmosphere—

A sample (124.1630 mg) of the powdered composition prepared as in Example 20 was heated in a TGA chamber under an argon atmosphere at 5° C./min to 250° C. and held at this temperature for 2 hr to consolidate to a solid shaped thermoset polymer. During the heat treatment, the sample showed an endothermic transition at about 195° C. attributed to the melting point of TPEB. The isothermal heat treatment at 250° C. resulted in the reaction of the ethynyl units in the TPEB and conversion to the shaped solid thermoset polymer. The resulting thermoset polymer contained a homogeneous distribution of $ZrH_2$ embedded in the domain of the polymer. Further heating above 500° C. resulted in the degradation of the $ZrH_2$ to Zr nanoparticles and $H_2$; the $H_2$ vaporized from the sample as formed. Heating from 500° C. to 1400° C. resulted in the reaction of the highly reactive Zr nanoparticles with the developing carbon atoms being formed from degradation of TPEB during the simple carbonization process resulting in the formation of ZrC nanoparticles embedded in excess carbon. The solid thermoset polymer sample was slowly heated at 2° C./min to 1400° C. and held at this temperature for 4 hr affording a weight retention of 93.77 wt of a solid ceramic solid. The refractory ZrC ceramic carbon matrix composition is formed in one step. XRD analysis showed high yield of ZrC nanoparticles and a small amount of crystalline carbon as the products formed during the heat treatment.

Example 23

Mixing and Conversion of Precursor Compositions of $TiH_2$/TPEB and $ZrH_2$/TPEB to Refractory TiC and ZrC in Carbon Matrix in One Step by Heating in Argon Atmosphere to 1000° C.—

A sample (30.1234 mg) of $TiH_2$/TPEB powdered composition prepared as in Example 1 and a sample (55.2685 mg) of $ZrH_2$/TPEB powdered composition prepared as in Example 20 were thoroughly mixed and placed in a TGA pan. The resulting mixture was heated at 2° C. under a flow (100 cc/min) of argon to 1200° C. yielding a solid material with a weight retention of 94.34%. During the heat treatment, the sample melted at about 194° C. (endothermic transition; TPEB) and exhibited an exothermic transition peaking at about 292° C. attributed to the cure of the TPEB to solid thermoset polymer. After cooling from 1200° C. to room temperature, the solid ceramic material was removed from the TGA pan, characterized by XRD and was found to contain nanoparticle sized TiC and ZrC in an excess of carbon as the matrix. The shaped solid ceramic refractory TiC and ZrC carbon composition was formed in one step and exhibited structural integrity.

Example 24

Formation of Refractory ZrN Solid Ceramic in One Step by Heating at 10° C./Min to 1400° C. Under an Argon Atmosphere—

Figure 8:
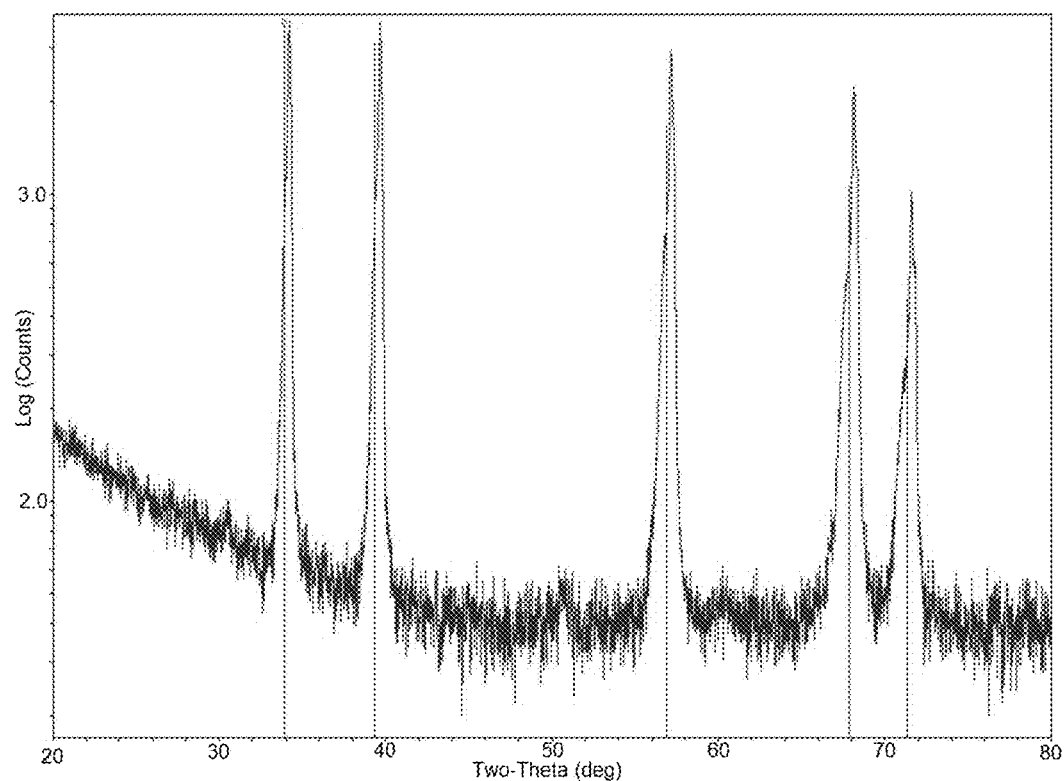
FIG. 8 shows an XRD of a sample containing ZrN nanoparticles.

A sample (31.51895 mg) of the precursor composition prepared as in Example 20 was weighed into a TGA ceramic pan and heated at 10° C. under a flow (100 cc/min) of nitrogen to 1400° C. yielding a solid material with a weight retention of 96.5%. During the heat treatment, the sample melted at about 194° C. (endothermic transition; TPEB) and exhibited an exothermic transition peaking at about 292° C. attributed to the cure of TPEB to solid thermoset polymer. After cooling from 1400° C. to room temperature, the solid ceramic material was removed from the TGA pan, characterized by XRD, and was found to contain nanoparticle sized ZrN embedded in an excess of carbon as the matrix. The shaped solid ZrN carbon composite was formed in one step and exhibited structural integrity. ZrN was formed rather than ZrC because of the nitrogen atmosphere, which was the source of the nitrogen in the refractory ZrN nanoparticles. FIG. 8 shows a typical XRD of a ZrN sample made by the method of this example.

Example 25

Melt Formulation of Solid Precursor Thermoset Polymeric Composition of $ZrH_2$ and TPEB—

TPEB (0.792 g; 1.66 mmol) was melted at 255° C. in an aluminum planchet treated with a silicone mold release. $ZrH_2$ (3.00 g; 32.2 mmol) was added to the melt, thoroughly mixed, and heated at 255° C. under an inert atmosphere until the mixture thickened from polymerization of the acetylene units of TPEB to a thermoset polymer. Once solidification (30 min) had occurred to a shaped thermoset polymer, the solid polymer mass was cooled and removed from the mold. By the method described, the ratio of the two reactants (TPEB and $ZrH_2$) can be varied, which will affect the overall physical properties of the thermoset polymer containing a homogeneous distribution of $ZrH_2$ within the domain of the polymeric thermoset.

Example 26

Conversion of Solid Precursor Thermoset Polymeric Composition of $ZrH_2$ and TPEB to Refractory ZrC Solid Ceramic in One Step by Heating at 10° C./Min to 1000° C. Under an Argon Atmosphere—

A sample (3.156 g) of solid thermoset composition prepared as in Example 25 was placed in a tube furnace and heated under an argon atmosphere at 2° C./min to 1000° C. yielding the solid ceramic material with a weight retention of 94%. The sample was characterized by XRD and was found to contain a homogeneous distribution of ZrC nanoparticles in an excess of carbon as the matrix. The ZrC nanoparticle carbon solid composition was formed in one step and retained its solid structural integrity.

Example 27

Conversion of Solid Precursor Thermoset Polymeric Composition of $ZrH_2$ and TPEB to Refractory ZrN Solid Ceramic in One Step by Heating at 10° C./Min to 1000° C. Under a Nitrogen Atmosphere—

Another polymeric sample (4.523 g) prepared as in Example 25 was placed in a tube furnace and heated under a nitrogen atmosphere at 2° C./min to 1000° C. yielding the solid ceramic material with a weight retention of 99%. The sample was characterized by XRD and was found to form a ZrN nanoparticle carbon composition. At least the ZrN was present on the outer surfaces in an excess of carbon as the matrix. The ZrN nanoparticle carbon solid composition was formed in one step and the sample retained its solid structural integrity. A large thick sample would probably contain ZrN on the outer part of the sample and ZrC in the interior part of the sample.

Example 28

Formulation of Precursor Composition of $HfH_2$ and TPEB—

TPEB (0.0.0974 g; 0.203 mmol) and $HfH_2$ (0.500 g; 5.361 mmol) were thoroughly mixed in the powder form and used as the precursor for the formation of shaped solid $HfH_2$ polymeric compositions.

Example 29

Formulation of Precursor Composition of $HfH_2$ and TPEB—

TPEB (87 mg; 0.182 mmol) and $HfH_2$ (1.00 mg; 5.54 mmol) were thoroughly mixed and used as the precursor for the formation of refractory nanoparticle HfC embedded or bonded with the slight excess carbon that behaves as a matrix material. The ratio of the two reactants can be easily varied which will affect the overall physical properties of the corresponding $HfH_2$ thermoset polymers, which are readily converted to HfC-carbon matrix compositions by heating the polymeric compositions above 500° C. in an argon atmosphere. In addition, the amounts of each reactant can be changed to afford basically the formation of just HfC in which the ratio of Hf atoms to carbon atoms is 1:1.

Example 30

Formation of Refractory HfC Solid Ceramic Composition in One Step by Heating at 10° C./Min to 1400° C. Under an Argon Atmosphere—

Figure 9:
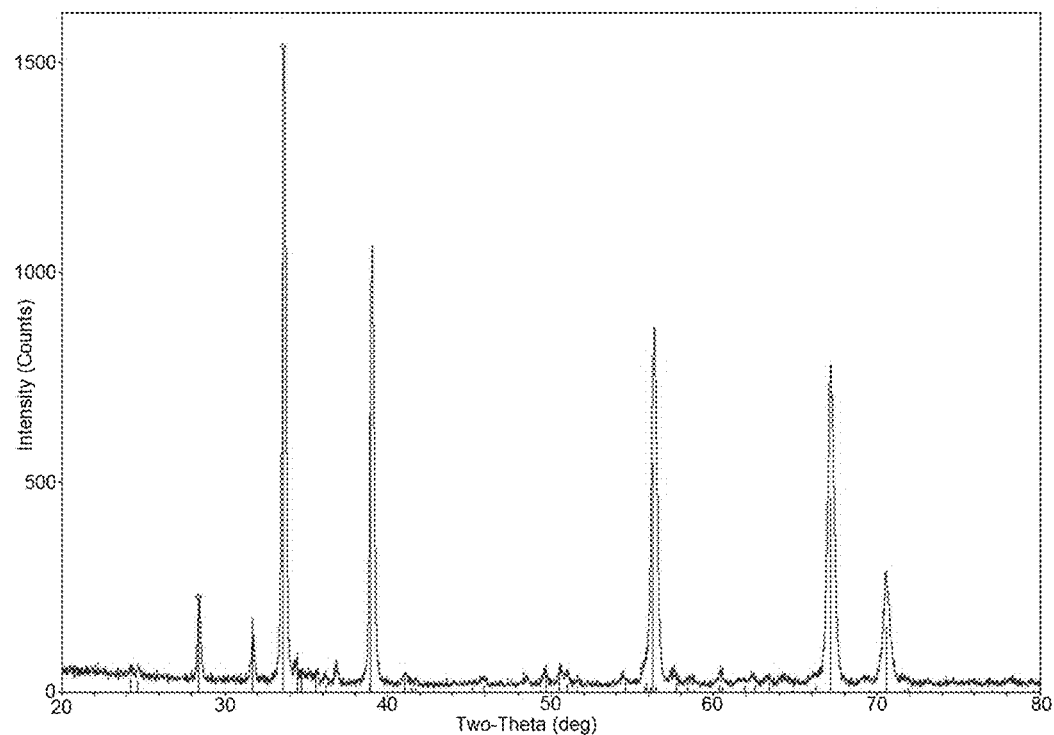
FIG. 9 shows an XRD of a sample containing HfC nanoparticles.

A sample (71.8978 mg) of the precursor mixture prepared in Example 28 was weighed into a TGA ceramic pan and heated at 10° C. under a flow (100 cc/min) of argon to 1400° C. yielding a solid material with a weight retention of 98.45%. During the heat treatment, the TPEB in the precursor mixture melted at about 194° C. (endothermic transition; TPEB) and exhibited an exothermic transition peaking at about 292° C. attributed to the cure of TPEB to a solid thermoset polymer. After cooling from 1400° C. to room temperature, the solid ceramic material was removed from the TGA pan, characterized by XRD and was found to contain nanoparticle sized HfC in an excess of carbon as the matrix. The shaped solid ceramic refractory HfC carbon composite was formed in one step and exhibited structural integrity. FIG. 9 shows a typical XRD of a HfC sample made by the method of this example.

Example 31

Formation of Refractory HfN Solid Ceramic Composition in One Step by Heating at 10° C./Min to 1400° C. Under an Argon Atmosphere—

A sample (75.7452 mg) of the precursor mixture prepared in Example 28 was weighed into a TGA ceramic pan and heated at 10° C. under a flow (100 cc/min) of nitrogen to 1400° C. yielding a solid material with a weight retention of 99.34%. During the heat treatment, the TBEB in the precursor mixture melted at about 194° C. (endothermic transition; TPEB) and exhibited an exothermic transition peaking at about 292° C. attributed to the cure of TPEB to a solid thermoset polymer. After cooling from 1400° C. to room temperature, the solid ceramic was removed from the TGA pan, characterized by XRD and was found to contain nanoparticle sized HfN in an excess of carbon as the matrix. The shaped solid ceramic refractory HfN carbon composite was formed in one step and exhibited structural integrity.

Example 32

Formation of Refractory HfC Solid Ceramic Composition in One Step by Heating at 10° C./Min to 1400° C. Under an Argon Atmosphere—

A sample (71.8978 mg) of the precursor mixture prepared in Example 29 was weighed into a TGA ceramic pan and heated at 5° C. under a flow (100 cc/min) of argon to 1400° C. yielding a solid material with a weight retention of 98.89%. After cooling from 1400° C. to room temperature, the solid ceramic material was removed from the TGA pan, characterized by XRD and was found to contain nanoparticle sized HfC in an excess of carbon as the matrix. The shaped solid ceramic refractory HfC carbon composite was formed in one step and exhibited structural integrity.

Example 33

Formulation of Solid Precursor Composition of Tungsten Powder (~600-900 nm Particle Size) and TPEB by Melt Mixing—

TPEB (0.680 g; 1.422 mmol) was melted at 250° C. in an aluminum planchet treated with a silicone mold release. Tungsten powder (2.00 g; 10.87 mmol) was added, thoroughly mixed, and heated at 250° C. until the mixture thickened attributed to the polymerization of the acetylene units of TPEB to thermoset polymer. On solidification (30 min) of the TPEB to the thermoset polymer, the solid shaped polymer mass was cooled and removed from the mold.

Example 34

Formation of Refractory WC Solid Ceramic in One Step by Heating at 10° C./Min to 1000° C. Under an Argon Atmosphere—

A sample (2.542 g) of the polymeric composition prepared in Example 33 was heated in a tube furnace at 2° C./min to 1000° C. yielding the solid ceramic material with a weight retention of 95%. The sample was characterized by XRD and was found to contain WC in a large excess of carbon as the matrix along with some unreacted tungsten. The WC carbon solid composite was formed in one step. Nanoparticle-sized tungsten or small-sized tungsten powder would be expected to increase the yield of WC and potentially eliminate the presence of unreacted tungsten. Heating of the sample at a higher temperature (1200° C.) reduced the amount of unreacted tungsten and increased the amount of WC present in the sample.

Example 35

Formulation of Precursor Composition of $TiH_2$ and TPEB with Excess Carbon Source (TPEB)—

TPEB (2.10 g; 4.39 mmol) and $TiH_2$ (4.95 g; 99.1 mmol) were thoroughly mixed in the powder form and used as the precursor for the formation of refractory nanoparticle TiC in a carbon matrix carbon fiber composite.

Example 36

Formulation of $TiH_2$ Carbon Fiber Polymeric Composite—

Into a 0.5 inch diameter mold formed from aluminum foil was placed the precursor composition (1.7541 g of the TPEB and $TiH_2$ mixture) prepared in Example 35. The mixture was heated to 220° C. (melt) and chopped carbon fibers were added and mixed into the composition. The resulting carbon fiber-precursor composition was heated under a flow of argon at 250° C. for 1 hr resulting in solidification to a shaped carbon fiber-containing polymeric thermoset.

Example 37

Conversion of the $TiH_2$ Carbon Fiber Polymeric Composite to TiC Carbon Fiber Ceramic Composite—

The solid shaped carbon fiber polymeric composite prepared in Example 36 with a homogeneous distribution of the $TiH_2$ was removed from the mold, placed in an oven, and heated under a flow of argon at 3° C./min to 1000° C. and held at the temperature for 2 hr. The resulting ceramic-carbon reinforced composite was cooled at 3° C./min back to room temperature. The solid composite sample was characterized by XRD and found to contain refractory TiC nanoparticles embedded in carbon matrix and carbon fibers.

Example 38

Formation of Refractory $ZrH_2$ Carbon Fiber Polymeric Composite—

Into a 0.5 inch diameter mold fabricated from aluminum foil was placed a precursor composition (1.9545 g of the TPEB and $ZrH_2$ mixture) prepared as in Example 20. The composition was heated to 220° C. (melt) and chopped carbon fibers were added and mixed into the liquid composition. The resulting carbon fiber-precursor composition was heated under a flow of argon at 250° C. for 1 hr resulting in solidification to a shaped carbon fiber-containing polymeric thermoset. The solid shaped carbon fiber polymeric composite with a homogeneous distribution of the $ZrH_2$ was removed from the mold.

Example 39

Conversion of the $ZrH_2$ Carbon Fiber Polymeric Composite to ZrC Carbon Fiber Ceramic Composite—

The solid shaped carbon fiber polymeric composite prepared in Example 38 was placed in an oven and heated under a flow of argon at 3° C./min to 1200° C. and held at the temperature for 2 hr. The resulting ceramic-carbon fiber reinforced composite was cooled at 3° C./min back to room temperature. The solid ceramic-carbon fiber composite sample was characterized by XRD and found to contain refractory ZrC nanoparticles embedded in carbon matrix and carbon fibers.

Example 40

Formation of Refractory $HfH_2$ Carbon Fiber Polymeric Composite—

Into a 0.5 inch diameter mold fabricated from aluminum foil was placed a precursor composition (2.5564 g of the TPEB and $HfH_2$ mixture) prepared as in Example 29. The composition was heated to 220° C. (melt) and chopped carbon fibers were added and mixed into the liquid composition. The resulting carbon fiber-precursor composition was heated under a flow of argon at 250° C. for 1 hr resulting in solidification to a shaped carbon fiber-containing polymeric thermoset. The solid shaped carbon fiber polymeric composite with a homogeneous distribution of the $HfH_2$ was removed from the mold.

Example 41

Conversion of the $HfH_2$ Carbon Fiber Polymeric Composite to HfC Carbon Fiber Ceramic Composite—

The solid shaped carbon fiber polymeric composite prepared in Example 40 was placed in an oven and heated under a flow of argon at 3° C./min to 1200° C. and held at the temperature for 4 hr. The resulting ceramic-carbon fiber reinforced composite was cooled at 3° C./min back to room temperature. The solid ceramic-carbon fiber composite sample was characterized by XRD and found to contain refractory HfC nanoparticles embedded in carbon matrix and carbon fibers.

Example 42

Formulation of Precursor Composition of Tantalum Powder (9-12 Micron Particle Size) and TPEB with Excess Carbon Source (TPEB)—

TPEB (0.340 g; 0.711 mmol) and tantalum powder (1.00 g; 5.53 mmol) were thoroughly mixed and used as the precursor composition for the formation of refractory nanoparticle TaC embedded or bonded with the excess carbon that behaves as a matrix material.

Example 43

Conversion of Precursor Composition of Tantalum Powder (9-12 Micron Particle Size) and TPEB by Heating at 1200° C. for 6 Hr Under Flow of Argon—

A sample (0.7567 g) of the precursor composition prepared in Example 42 was heated at 3° C./min under a flow of argon to 1200° C. and held at this temperature for 6 hr. The solid sample was cooled to room temperature. The solid ceramic sample was characterized by XRD and found to contain refractory TaC, carbon, and unreacted Ta.

Example 44

Formulation of Prepolymer Composition of TPEB—

TPEB (7.00 g; 14.6 mmol) was placed in an aluminum planchet and heated at 250° C. for 30 minutes or until the mixture was viscous to stir with a metal spatula. The mixture was cooled, broken into small pieces, and ball milled for 2 minutes resulting in a fine black powder.

Example 45

Formulation of Precursor Composition of $TiH_2$ and TPEB Prepolymer and Formation of Shaped Pellet—

TPEB prepolymer form Example 44 (0.300 g; 0.627 mmol) and $TiH_2$ (0.825 g; 16.5 mmol) were ball milled for 5 minutes resulting in a deep red-black fine powder. The powder was placed in a 13 mm pellet press and pressed to 10,000 pounds for 1 minute.

Example 46

Conversion of Precursor Composition of $TiH_2$ and TPEB Prepolymer to Solid Shaped Thermoset—

The pellet from Example 45 was placed in a furnace, heated at 20° C./min under an argon atmosphere to 210° C., and held at this temperature for 10 hr (overnight) resulting in the formation of a tough shaped polymeric thermoset solid. The $TiH_2$ was homogeneously dispersed in the solid thermoset.

Example 47

Conversion of Precursor Composition of $TiH_2$ and TPEB Prepolymer to Solid Shaped Thermoset—

Another pellet prepared as in Example 45 was placed in a furnace, heated at 20° C./min under an argon atmosphere to 250° C., and held at this temperature for 2 hr resulting in the formation of a tough shaped polymeric thermoset solid.

Example 48

Formation of Refractory TiC Solid Ceramic in One Step by Heating at 10° C./Min to 1600° C. Under an Argon Atmosphere—

Figure 10:
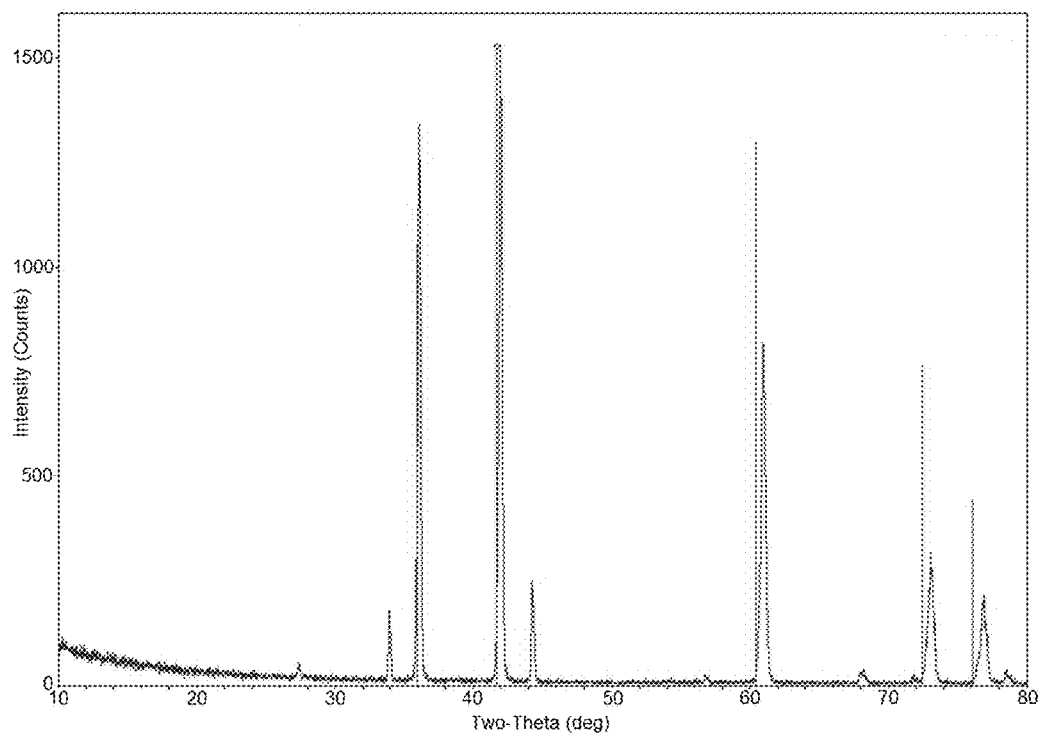
FIG. 10 shows an XRD of a sample containing TiC nanoparticles after heating to 1600° C.

The shaped polymeric thermoset solid (1.12 g) from Example 46 was placed in a 3" tube furnace, heated at 2° C./min under a flow (100 cc/min) of argon to 1600° C., and held at 1600° C. for 2 hr yielding a solid dense ceramic with weight retention of 92.1%. The solid ceramic was removed from the furnace, characterized by XRD, and found to form nanoparticle sized TiC in an excess of carbon as the matrix. The TiC carbon solid composition was formed in one step and exhibited great structural integrity, hardness, and toughness. FIG. 10 shows a typical XRD of a TiC sample made by the method of this example.

Example 49

Heat Treatment of Refractory TiC Solid Ceramic by Heating to 1900° C. Under Vacuum—

Figure 11:
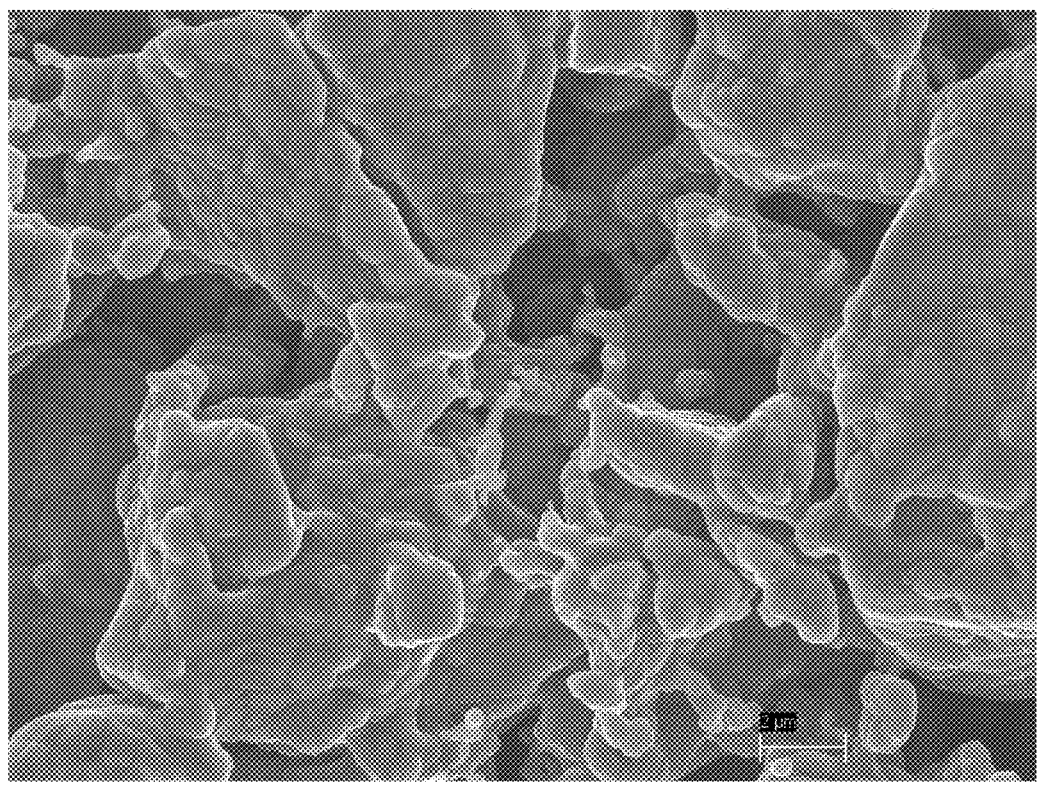
FIG. 11 shows a scanning electron micrograph (SEM) of a sample containing TiC nanoparticles.

The 1600° C. treated ceramic pellet (0.839 g) from Example 48 was placed in a graphitic furnace, heated at 10° C./min under a vacuum ($10^{-4}$) to 1900° C., and held at 1900° C. for 2 hr yielding a solid dense ceramic with a weight retention of 95.8%. Upon cooling, the solid ceramic was removed from the furnace, characterized by XRD, and found to form larger nanoparticle sized TiC in an excess of carbon as the matrix. FIG. 11 shows a typical SEM of a TiC sample made by the method of this example.

Example 50

Formulation of Precursor Composition of $TiH_2$ and TPEB Prepolymer, Formation of Shaped Pellet, and Direct Conversion to Refractory TiC Solid Ceramic Carbon Composition in One Step—

TPEB prepolymer (0.305 g, 0.627 mmol) prepared as in Example 44 and $TiH_2$ (0.828 g; 16.5 mmol) were ball milled for 5 minutes resulting in a deep red-black fine powder. The powder was placed in a 13 mm pellet press and pressed to 10,000 pounds for 1 minute. The pellet was then placed in a furnace, heated at 20° C./min under an argon atmosphere to 250° C., and held at this temperature for 30 minutes followed by heating at 2° C./min under a flow (100 cc/min) of argon to 1200° C. and holding at 1200° C. for 3 hr yielding a solid dense ceramic with weight retention of 94.8%. Upon cooling, the solid ceramic was removed from the furnace, characterized by XRD, and found to form nanoparticle sized TiC in an excess of carbon as the matrix. The TiC carbon solid composition was formed in one step and exhibited great structural integrity, hardness, and toughness.

Example 51

Formulation of Precursor Composition of Tungsten Powder and TPEB Prepolymer and Pellet Formation—

TPEB prepolymer from Example 44 (0.150 g; 0.314 mmol) and tungsten powder (1.95 g; 10.6 mmol) were ball milled for 5 minutes resulting in a deep red-black fine powder. The powder was placed in a 13 mm pellet press and pressed to 10,000 pounds for 10 sec.

Example 52

Conversion of Precursor Composition of Tungsten Powder and TPEB Prepolymer to Solid Shaped Thermoset—

The pellet from Example 51 was placed in a furnace, heated at 20° C./min under an argon atmosphere to 225° C., and held at this temperature for 10 hr (overnight) resulting in the formation of a tough shaped polymeric solid. The tungsten powder was homogeneous dispersed in the solid thermoset.

Example 53

Formation of Refractory WC Solid Ceramic in One Step by Heating at 10° C./Min to 1600° C. Under an Argon Atmosphere—

Figure 12:
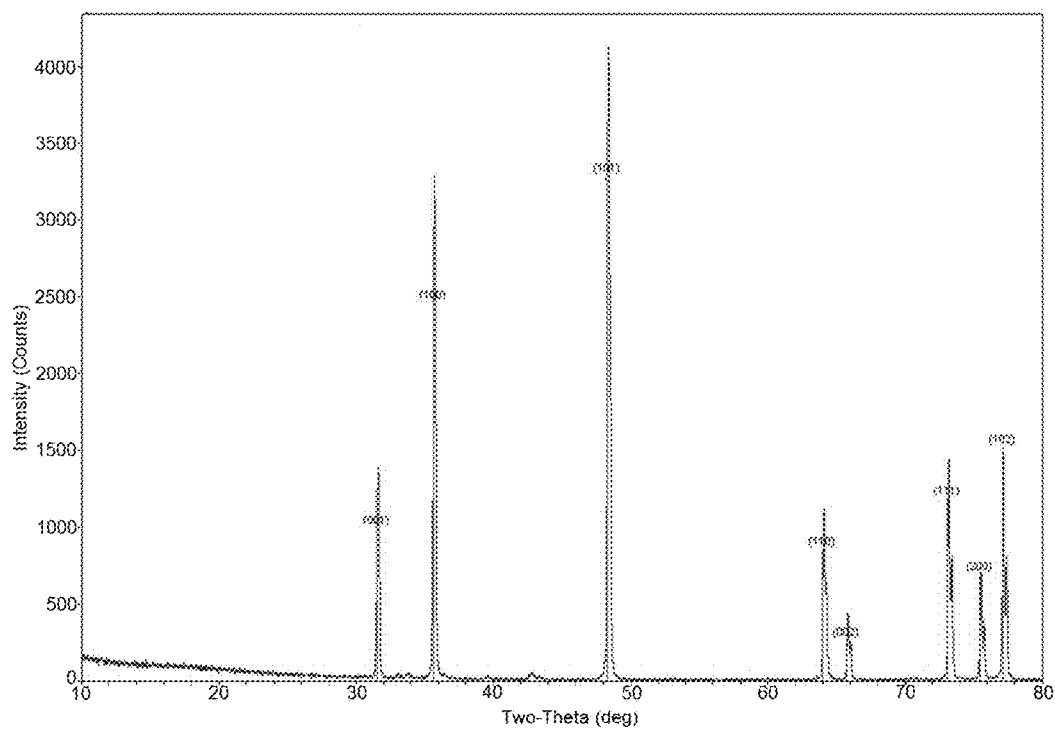
FIG. 12 shows an XRD of a sample containing WC nanoparticles.
Figure 13:
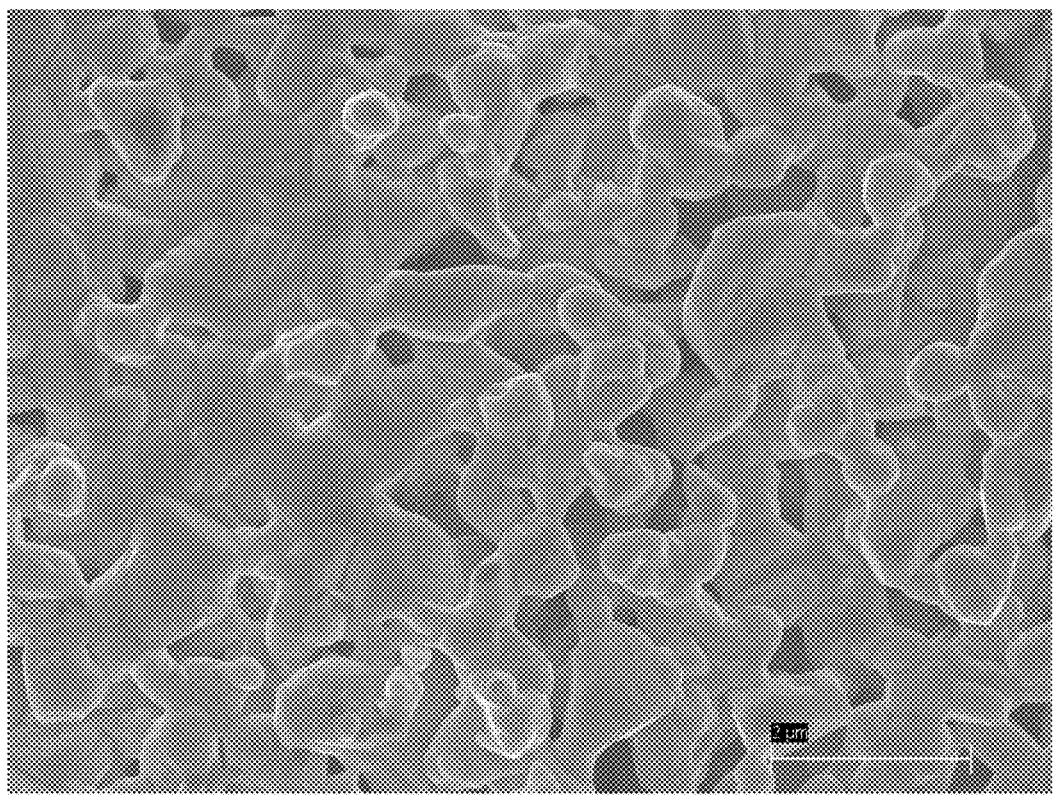
FIG. 13 shows an SEM of a sample containing WC nanoparticles.

The cured thermoset pellet (2.03 g) from Example 52 was placed in a 3" tube furnace, heated at 2° C./min under a flow (100 cc/min) of argon to 1600° C., and held at 1600° C. for 2 hr yielding a solid dense ceramic with weight retention of 96.25%. Upon cooling, the solid ceramic was removed from the furnace, characterized by XRD, and found to form nanoparticle sized pure WC in an excess of carbon as the matrix. All of the tungsten had reacted. The WC carbon solid composition was formed in one step and exhibited structural integrity, hardness, and toughness. FIG. 12 shows a typical XRD of a WC sample made by the method of this example. FIG. 13 shows a typical SEM of a WC sample made by the method of this example.

Example 54

Heat Treatment of Refractory WC Solid Ceramic to 1900° C. Under Vacuum—

The 1600° C. treated solid ceramic pellet (1.95 g) from Example 53 was placed in a graphitic furnace, heated at 10° C./min under a vacuum ($10^{-4}$) to 1900° C., and held at 1900° C. for 2 hr yielding a weight retention of 99.7%. Upon cooling, the solid ceramic was removed from the furnace, characterized by XRD, and found to form larger nanoparticle sized WC in an excess of carbon as the matrix relative to the heat treatment to 1600° C. as formed in Example 53. The WC carbon solid still exhibited great structural integrity, hardness, and retained toughness.

Example 55

Formulation of Precursor Composition of $HfH_2$ and TPEB Prepolymer—

TPEB prepolymer from Example 44 (0.217 g; 0.454 mmol) and hafnium hydride (2.49 g; 13.8 mmol) were ball milled for 5 minutes resulting in a deep red-black fine powder. The powder was placed in a 13 mm pellet press and pressed to 10,000 pounds for 10 sec.

Example 56

Conversion of Precursor Composition of $HfH_2$ and TPEB Prepolymer to Solid Shaped Thermoset—

The pellet from Example 55 was placed in a furnace, heated at 20° C./min under an argon atmosphere to 225° C., and held at this temperature for 10 hr (overnight) resulting in the formation of a tough shaped polymeric solid. The hafnium hydride powder was homogeneous dispersed in the solid thermoset.

Example 57

Formation of Refractory HfC Solid Ceramic in One Step by Heating at 10° C./Min to 1600° C. Under an Argon Atmosphere—

The cured thermoset pellet (2.68 g) from Example 56 was placed in a 3" tube furnace, heated at 2° C. min under a flow (100 cc/min) of argon to 1600° C., and held at 1600° C. for 2 hr yielding a solid dense ceramic with weight retention of 98.5%. Upon cooling, the solid ceramic was removed from the furnace, characterized by XRD, and found to form nanoparticle sized pure HfC in an excess of carbon as the matrix. The HfC carbon solid composition was formed in one step and exhibited structural integrity, hardness, and toughness.

Example 58

Heat Treatment of Refractory HfC Solid Ceramic by Heating to and at 1900° C. Under Vacuum—

The 1600° C. treated HfC-carbon composition/pellet (1.95 g) from Example 57 was placed in a graphitic furnace, heated at 10° C./min under a vacuum ($10^{-4}$) to 1900° C., and held at 1900° C. for 2 hr yielding a solid dense ceramic with a weight retention of 96.6%. Upon cooling, the solid ceramic was removed from the furnace, characterized by XRD, and found to form larger nanoparticle sized HfC in an excess of carbon as the matrix. The HfC carbon solid exhibited great structural integrity, hardness, and toughness.

Example 59

Formulation of Precursor Composition of $ZrH_2$ and TPEB Prepolymer—

TPEB prepolymer from Example 44 (0.132 g; 0.276 mmol) and zirconium hydride (0.500 g; 5.36 mmol) were ball milled for 5 minutes resulting in a deep red-black fine powder. The powder was placed in a 13 mm pellet press and pressed to 8,000 pounds for 10 sec.

Example 60

Conversion of Precursor Composition of $ZrH_2$ and TPEB Prepolymer to Solid Shaped Thermoset—

The pellet from Example 59 was placed in a furnace, heated at 20° C./min under an argon atmosphere to 210° C., and held at this temperature for 10 hr (overnight) resulting in the formation of a tough shaped polymeric solid. The zirconium hydride powder was homogeneously dispersed in the solid thermoset.

Example 61

Formation of Refractory ZrC Solid Ceramic in One Step by Heating at 10° C./Min to 1600° C. Under an Argon Atmosphere—

The cured thermoset pellet (0.630 g) from Example 60 was placed in a 3" tube furnace, heated at 2° C./min under a flow (100 cc/min) of argon to 1600° C., and held at 1600° C. for 2 hr yielding a solid dense ceramic with weight retention of 93.5%. Upon cooling, the solid ceramic was removed from the furnace, characterized by XRD, and found to form nanoparticle sized pure ZrC in an excess of carbon as the matrix. The ZrC carbon solid composition was formed in one step and exhibited structural integrity, hardness, and toughness.

Example 62

Heat Treatment of Refractory ZrC Solid Ceramic by Heating to 1900° C. Under Vacuum—

The 1600° C. treated ceramic pellet (0.589 g) from Example 61 was placed in a graphitic furnace and heated at 10° C./min under a vacuum ($10^{-4}$) to 1900° C. for 2 hr yielding a solid dense ceramic with a weight retention of 96.9%. The solid ceramic was removed from the furnace, characterized by XRD, and found to form larger nanoparticle sized ZrC in an excess of carbon as the matrix. The ZrC carbon solid exhibited great structural integrity, hardness, and toughness.

Example 63

Formulation of Precursor Composition of $TiH_2$ and TPEB Prepolymer Containing Chopped Fibers—

TPEB prepolymer from Example 44 (3.825 g; 8.00 mmol) and $TiH_2$ (10.52 g; 211 mmol) were ball milled for 5 minutes resulting in a deep red-black fine powder. Chopped fibers (1.00 g, ¼" length) were added and the solid mixture was placed in 100 mL of acetone and stirred for 6 hr. The solvent was removed and the solid mixture was placed in a 2½" pellet die and pressed to 10,000 pounds for 1 minute.

Example 64

Conversion of Precursor Composition of $TiH_2$ and TPEB Prepolymer Containing Chopped Fibers to Thermoset—

The 2½" pellet from Example 63 was placed in a furnace, heated at 20° C./min under an argon atmosphere to 210° C., and held at this temperature for 10 hr (overnight) resulting in the formation of a tough shaped polymeric carbon fiber reinforced thermoset solid. The titanium hydride powder was homogeneous dispersed in the solid thermoset-carbon fiber composite.

Example 65

Formation of Refractory Carbon Fiber Reinforced TiC Solid Ceramic in One Step by Heating at 10° C./Min to 1600° C. Under an Argon Atmosphere—

The carbon fiber-containing shaped polymeric thermoset pellet (14.9 g) from Example 64 was placed in a 3" tube furnace and heated at 2° C./min under a flow (100 cc/min) of argon to 1600° C. yielding a solid dense carbon fiber reinforced ceramic with weight retention of 96.1%. Upon cooling, the solid carbon fiber reinforced ceramic was removed from the furnace, characterized by XRD, and found to form nanoparticle sized TiC in the carbon-carbon fiber composite. The TiC carbon-carbon fiber solid composition exhibited great structural integrity with the inclusion of the fiber reinforcement.

Example 66

Formulation of Precursor Composition of $ZrH_2$ and TPEB Prepolymer Containing Chopped Fibers—

TPEB prepolymer from Example 44 (2.64 g; 5.52 mmol) and $ZrH_2$ (10.00 g; 107 mmol) were ball milled for 5 minutes resulting in a deep red-black fine powder. Chopped fibers (0.50 g, ¼" length) were added and the solid mixture was placed in 100 mL of acetone and stirred for 4 hr. The solvent was removed and the solid mixture was placed in a 2½" pellet die and pressed to 10,000 pounds for 1 minute.

Example 67

Conversion of Precursor Composition of $ZrH_2$ and TPEB Prepolymer Containing Chopped Fibers to Thermoset—

The 2½" pellet from Example 66 was placed in a furnace, heated at 20° C./min under an argon atmosphere to 210° C. and held at this temperature for 10 hr (overnight) resulting in the formation of a tough shaped carbon fiber reinforced polymeric solid. The zirconium hydride powder was homogeneous dispersed in the solid thermoset-carbon fiber composite.

Example 68

Formation of Refractory ZrC Solid Carbon Fiber Reinforced Ceramic in One Step by Heating at 10° C./Min to 1600° C. Under an Argon Atmosphere—

The carbon fiber-containing shaped polymeric thermoset pellet (12.48 g) from Example 67 was placed in a 3" tube furnace and heated at 2° C./min under a flow (100 cc/min) of argon to 1600° C. yielding a solid dense carbon fiber reinforced ceramic with weight retention of 96.7%. The solid carbon fiber reinforced ceramic was removed from the furnace, characterized by XRD, and found to form nanoparticle sized ZrC in the carbon-carbon fiber composite. The ZrC carbon-carbon fiber solid composition exhibited great structural integrity with the inclusion of the fiber reinforcement.

Example 69

Formulation of Precursor Composition of Tungsten Powder and TPEB Prepolymer Containing Chopped Fibers—

TPEB prepolymer from Example 44 (1.5 g; 3.14 mmol) and tungsten powder (19.5 g; 106 mmol) were ball milled for 5 minutes resulting in a deep red-black fine powder. Chopped fibers (1.50 g, ¼" length) were added and the solid mixture was placed in 100 mL of acetone and stirred for 6 hr. The solvent was removed and the solid mixture was placed in a 2½" pellet die and pressed to 12,000 pounds for 1 minute.

Example 70

Conversion of Precursor Composition of Tungsten Powder and TPEB Prepolymer Containing Chopped Fibers to Thermoset—

The 2½" pellet from Example 69 was placed in a furnace, heated at 20° C./min under an argon atmosphere to 210° C., and held at this temperature for 10 hr (overnight) resulting in the formation of a tough shaped carbon fiber reinforced polymeric solid. The tungsten powder was homogeneous dispersed in the solid thermoset-carbon fiber composite.

Example 71

Formation of Refractory WC Solid Carbon Fiber Reinforced Ceramic in One Step by Heating at 10° C./Min to 1600° C. Under an Argon Atmosphere—

The carbon fiber-containing shaped polymeric thermoset pellet (21.15 g) from Example 70 was placed in a 3" tube furnace and heated at 2° C./min under a flow (100 cc/min) of argon to 1600° C. yielding a solid dense carbon fiber reinforced ceramic with weight retention of 98.1%. The solid carbon fiber reinforced ceramic was removed from the furnace, characterized by XRD, and found to form nanoparticle sized WC in the carbon-carbon fiber composite. The WC carbon-carbon fiber solid composition exhibited great structural integrity with the inclusion of the fiber reinforcement.

Example 72

Formulation of Precursor Composition of $TiH_2$ and TPEB Prepolymer at a 1C:1Ti Atom Ratio and Formation of Shaped Pellet—

TPEB prepolymer form Example 44 (0.100 g; 0.209 mmol) and $TiH_2$ (0.398 g; 7.94 mmol) were finely ground with a mortar and pestle. The powder was placed in an IR pellet press maker from Harrick Scientific Products and was pressed to form a thin pellet under vacuum.

Example 73 (Prophetic)

Conversion of Precursor Composition of $TiH_2$ and TPEB Prepolymer (1C:1Ti) to Solid Shaped Thermoset—

The pellet from Example 72 contained in the IR pellet press maker is treated to 300° C. in a vacuum oven for 2 hr to complete crosslinking of the prepolymer and released from the IR pellet press maker. The crosslinked pellet is further gradually thermally treated under vacuum to 500° C. and it held at this temperature for 2 hr.

Example 74 (Prophetic)

Formation of Refractory TiC Solid Ceramic in One Step by Heating at 10° C./Min to 1600° C. Under an Argon Atmosphere—

The shaped polymeric thermoset solid from Example 73 is placed in a 3" tube furnace, heated at 2° C./min under a flow (100 cc/min) of argon to 1600° C., and held at 1600° C. for 2 hr. The solid ceramic is removed from the furnace and characterized by XRD, and is expected to form nanoparticle sized TiC in an excess of carbon as the matrix.

Example 75

Formulation of Precursor Composition of $TiH_2$ and TPEB Prepolymer at a 1C:0.9Ti Atom Ratio and Formation of Shaped Pellet—

TPEB prepolymer form Example 44 (0.100 g; 0.209 mmol) and $TiH_2$ (0.359 g; 7.15 mmol) were finely ground with a mortar and pestle. The powder was placed in an IR pellet press maker and was pressed to form a thin pellet under vacuum.

Example 76 (Prophetic)

Conversion of Precursor Composition of $TiH_2$ and TPEB Prepolymer (1C:0.9Ti) to Solid Shaped Thermoset—

The pellet from Example 75 contained in the IR pellet press maker is treated to 300° C. in a vacuum oven for 2 hr to complete crosslinking of the prepolymer and released from the IR pellet press maker. The crosslinked pellet is further gradually thermally treated under vacuum to 500° C. and it was held at this temperature for 2 hr.

Example 77 (Prophetic)

Formation of Refractory TiC Solid Ceramic in One Step by Heating at 10° C./Min to 1600° C. Under an Argon Atmosphere—

The shaped polymeric thermoset solid from Example 76 is placed in a 3" tube furnace, heated at 2° C./min under a flow (100 cc/min) of argon to 1600° C., and held at 1600° C. for 2 hr. The solid ceramic is removed from the furnace, characterized by XRD, and is expected to form nanoparticle sized TiC in an excess of carbon as the matrix.

Example 78

Formulation of Precursor Composition of $TiH_2$ and TPEB Prepolymer at a 1C:0.8Ti Atom Ratio and Formation of Shaped Pellet—

TPEB prepolymer form Example 44 (0.100 g; 0.209 mmol) and $TiH_2$ (0.319 g; 6.35 mmol) were finely ground with a mortar and pestle. The powder was placed in an IR pellet press maker and was pressed to form a thin pellet under vacuum.

Example 79 (Prophetic)

Conversion of Precursor Composition of $TiH_2$ and TPEB Prepolymer (1C:0.8Ti) to Solid Shaped Thermoset—

The pellet from Example 78 contained in the IR pellet press maker is treated to 300° C. in a vacuum oven for 2 hr to complete crosslinking of the prepolymer and released from the IR pellet press maker. The crosslinked pellet is further gradually thermally treated under vacuum to 500° C. and held at this temperature for 2 hr.

Example 80 (Prophetic)

Formation of Refractory TiC Solid Ceramic in One Step by Heating at 10° C./Min to 1600° C. Under an Argon Atmosphere—

The shaped polymeric thermoset solid from Example 79 is placed in a 3" tube furnace, heated at 2° C./min under a flow (100 cc/min) of argon to 1600° C., and held at 1600° C. for 2 hr. The solid ceramic is removed from the furnace, characterized by XRD, and is expected to form nanoparticle sized TiC in an excess of carbon as the matrix.

Example 81

Formulation of Precursor Composition of $TiH_2$ and TPEB Prepolymer at a 1C:0.7Ti Atom Ratio and Formation of Shaped Pellet—

TPEB prepolymer form Example 44 (0.100 g; 0.209 mmol) and $TiH_2$ (0.279 g; 5.56 mmol) were finely ground with a mortar and pestle. The powder was placed in an IR pellet press maker and was pressed to form a thin pellet under vacuum.

Example 82 (Prophetic)

Conversion of Precursor Composition of $TiH_2$ and TPEB Prepolymer (1C:0.7Ti) to Solid Shaped Thermoset—

The pellet from Example 81 contained in the IR pellet press maker is treated to 300° C. in a vacuum oven for 2 hr to complete crosslinking of the prepolymer and released from the IR pellet press maker. The crosslinked pellet is further gradually thermally treated under vacuum to 500° C. and held at this temperature for 2 hr.

Example 83 (Prophetic)

Formation of Refractory TiC Solid Ceramic in One Step by Heating at 10° C./Min to 1600° C. Under an Argon Atmosphere—

The shaped polymeric thermoset solid from Example 83 is placed in a 3" tube furnace, heated at 2° C./min under a flow (100 cc/min) of argon to 1600° C., and held at 1600°

C. for 2 hr. The solid ceramic is removed from the furnace, characterized by XRD, and is expected to form nanoparticle sized TiC in an excess of carbon as the matrix.

Example 84

Formulation of Precursor Composition of TiH$_2$ and TPEB Prepolymer at a 1C:0.6Ti Atom Ratio and Formation of Shaped Pellet—

TPEB prepolymer form Example 44 (0.100 g; 0.209 mmol) and TiH$_2$ (0.239 g; 4.76 mmol) were finely ground with a mortar and pestle. The powder was placed in an IR pellet press maker and was pressed to form a thin pellet under vacuum.

Example 85 (prophetic)

Conversion of Precursor Composition of TiH$_2$ and TPEB Prepolymer (1C:0.6Ti) to Solid Shaped Thermoset—

The pellet from Example 84 contained in the IR pellet press maker is treated to 300° C. in a vacuum oven for 2 hr to complete crosslinking of the prepolymer and released from the IR pellet press maker. The crosslinked pellet is further gradually thermally treated under vacuum to 500° C. and it was held at this temperature for 2 hr.

Example 86 (Prophetic)

Formation of Refractory TiC Solid Ceramic in One Step by Heating at 10° C./Min to 1600° C. Under an Argon Atmosphere—

The shaped polymeric thermoset solid from Example 85 is placed in a 3" tube furnace, heated at 2° C./min under a flow (100 cc/min) of argon to 1600° C., and held at 1600° C. for 2 hr. The solid ceramic is removed from the furnace, characterized by XRD, and is expected to form nanoparticle sized TiC in an excess of carbon as the matrix.

Example 87

Formulation of Precursor Composition of TiH$_2$ and TPEB Prepolymer at a 1C:0.5Ti Atom Ratio and Formation of Shaped Pellet—

TPEB prepolymer form Example 44 (0.100 g; 0.209 mmol) and TiH$_2$ (0.199 g; 3.97 mmol) were finely ground with a mortar and pestle. The powder was placed in an IR pellet press maker and was pressed to form a thin pellet under vacuum.

Example 88 (Prophetic)

Conversion of Precursor Composition of TiH$_2$ and TPEB Prepolymer (1C:0.5Ti) to Solid Shaped Thermoset—

The pellet from Example 87 contained in the IR pellet press maker is treated to 300° C. in a vacuum oven for 2 hr to complete crosslinking of the prepolymer and released from the IR pellet press maker. The crosslinked pellet is further gradually thermally treated under vacuum to 500° C. and it was held at this temperature for 2 hr.

Example 89 (Prophetic)

Formation of Refractory TiC Solid Ceramic in One Step by Heating at 10° C./Min to 1600° C. Under an Argon Atmosphere—

The shaped polymeric thermoset solid from Example 88 is placed in a 3" tube furnace, heated at 2° C./min under a flow (100 cc/min) of argon to 1600° C., and held at 1600° C. for 2 hr. The solid ceramic is removed from the furnace, characterized by XRD, and is expected to form nanoparticle sized TiC in an excess of carbon as the matrix.

Obviously, many modifications and variations are possible in light of the above teachings. It is therefore to be understood that the claimed subject matter may be practiced otherwise than as specifically described. Any reference to claim elements in the singular, e.g., using the articles "a," "an," or "the" is not construed as limiting the element to the singular.

What is claimed is:

1. A composition comprising:
    a refractory-metal hydride; and
    an organic compound having a char yield of at least 60% by weight.

2. The composition of claim 1, wherein the refractory-metal hydride is titanium hydride, zirconium hydride, hafnium hydride, tungsten hydride, niobium hydride, molybdenum hydride, chromium hydride, tantalum hydride, or vanadium hydride.

3. The composition of claim 1, wherein the organic compound:
    contains only carbon and hydrogen;
    contains aromatic and acetylene groups;
    contains only carbon, hydrogen, and nitrogen or oxygen;
    contains no oxygen; or
    contains a heteroatom other than oxygen.

4. The composition of claim 1, wherein the organic compound is 1,2,4,5-tetrakis(phenylethynyl)benzene or a prepolymer thereof, N, N'-(1,4-phenylenedimethylidyne)-bis-(3-ethynylaniline), dianilphthalonitrile, or resorcinol phthalonitrile.

5. The composition of claim 1, wherein the composition comprises a material selected from the group consisting of, carbon fibers, ceramic fibers, and metal fibers.

6. A composition comprising:
    a refractory-metal hydride; and
    a thermoset made from an organic compound having a char yield of at least 60% by weight.

7. The composition of claim 6, wherein the refractory-metal hydride is titanium hydride, zirconium hydride, hafnium hydride, tungsten hydride, niobium hydride, molybdenum hydride, chromium hydride, tantalum hydride, or vanadium hydride.

8. The composition of claim 6, wherein the organic compound:
    contains only carbon and hydrogen;
    contains aromatic and acetylene groups;
    contains only carbon, hydrogen, and nitrogen or oxygen;
    contains no oxygen; or
    contains a heteroatom other than oxygen.

9. The composition of claim 6, wherein the organic compound is 1,2,4,5-tetrakis(phenylethynyl)benzene or a prepolymer thereof, N, N'-(1,4-phenylenedimethylidyne)-bis-(3-ethynylaniline), dianilphthalonitrile, or resorcinol phthalonitrile.

10. The composition of claim 6, wherein the composition comprises a material selected from the group consisting of, carbon fibers, ceramic fibers, and metal fibers.

11. A composition comprising:
    nanoparticles or particles of a refractory metal; and
    a thermoset made from an organic compound having a char yield of at least 60% by weight;
        wherein the composition comprises at least 10% by weight of the nanoparticles or particles of the refractory metal.

12. The composition of claim 11, wherein the refractory metal is titanium.

13. The composition of claim 11, wherein the refractory metal is selected from the group consisting of titanium, zirconium, hafnium, tungsten, niobium, molybdenum, chromium, tantalum, and vanadium.

14. The composition of claim 11, wherein the organic compound:
   contains only carbon and hydrogen;
   contains aromatic and acetylene groups;
   contains only carbon, hydrogen, and nitrogen or oxygen;
   contains no oxygen; or
   contains a heteroatom other than oxygen.

15. The composition of claim 11, wherein the organic compound is 1,2,4,5-tetrakis(phenylethynyl)benzene or a prepolymer thereof, N, N'-(1,4-phenylenedimethylidyne)-bis-(3-ethynylaniline), dianilphthalonitrile, or resorcinol phthalonitrile.

16. The composition of claim 11, wherein the composition comprises a material selected from the group consisting of, carbon fibers, ceramic fibers, and metal fibers.

17. The composition of claim 11, wherein the composition comprises at least 70% by weight of the nanoparticles or particles of the refractory metal.

18. A composition comprising:
   nanoparticles or particles of a refractory metal; and
   an organic compound having a char yield of at least 60% by weight;
      wherein the composition comprises at least 10% by weight of the nanoparticles or particles of the refractory metal.

19. The composition of claim 18, wherein the refractory metal is titanium.

20. The composition of claim 18, wherein the refractory metal is selected from the group consisting of titanium, zirconium, hafnium, tungsten, niobium, molybdenum, chromium, tantalum, and vanadium.

21. The composition of claim 18, wherein the metal component is selected from the group consisting of particles of the refractory metal, tungsten powder, and tantalum powder.

22. The composition of claim 18, wherein the organic compound:
   contains only carbon and hydrogen;
   contains aromatic and acetylene groups;
   contains only carbon, hydrogen, and nitrogen or oxygen;
   contains no oxygen; or
   contains a heteroatom other than oxygen.

23. The composition of claim 18, wherein the organic compound is 1,2,4,5-tetrakis(phenylethynyl)benzene or a prepolymer thereof, N, N'-(1,4-phenylenedimethylidyne)-bis-(3-ethynylaniline), dianilphthalonitrile, or resorcinol phthalonitrile.

24. The composition of claim 18, wherein the composition comprises a material selected from the group consisting of, carbon fibers, ceramic fibers, and metal fibers.

25. The composition of claim 18, wherein the composition comprises at least 70% by weight of the nanoparticles or particles of the refractory metal.

\* \* \* \* \*